(12) United States Patent
Forni

(10) Patent No.: US 12,456,907 B2
(45) Date of Patent: Oct. 28, 2025

(54) AIR GAP MAGNETIC COUPLING WITH THERMAL ISOLATION

(71) Applicant: Agilent Technologies, Inc., Santa Clara, CA (US)

(72) Inventor: Ronald J. Forni, Lexington, MA (US)

(73) Assignee: Agilent Technologies, Inc., Santa Clara, CA (US)

( * ) Notice: Subject to any disclaimer, the term of this patent is extended or adjusted under 35 U.S.C. 154(b) by 9 days.

(21) Appl. No.: 18/700,684

(22) PCT Filed: Oct. 22, 2021

(86) PCT No.: PCT/US2021/056354
§ 371 (c)(1),
(2) Date: Apr. 11, 2024

(87) PCT Pub. No.: WO2023/069119
PCT Pub. Date: Apr. 27, 2023

(65) Prior Publication Data
US 2024/0405653 A1    Dec. 5, 2024

(51) Int. Cl.
*H02K 49/10* (2006.01)
*F04C 2/02* (2006.01)
(Continued)

(52) U.S. Cl.
CPC .......... *H02K 49/108* (2013.01); *F04C 2/025* (2013.01); *F04C 18/0215* (2013.01);
(Continued)

(58) Field of Classification Search
CPC ....... H02K 49/104–108; F04C 15/0069; F04C 29/0064; F04D 13/024–027; F04D 25/026
See application file for complete search history.

(56) References Cited

U.S. PATENT DOCUMENTS

| 4,111,614 A | 9/1978 | Martin et al. |
| 5,286,179 A | 2/1994 | Forni et al. |

(Continued)

FOREIGN PATENT DOCUMENTS

| CN | 111030419 A | 4/2020 |
| CN | 111446839 A | 7/2020 |

(Continued)

OTHER PUBLICATIONS

Yarlott, Marc W. et al., Smart Couplings Enhance a Failing Hot Oil Pump at a Wastewater Treatment Plant, www.pumpsandsystems.com/smart-couplings-enhance-failing-hot-oil-pump-wastewater-treatment-plant, May 22, 2014; 7 pages.

(Continued)

*Primary Examiner* — Laert Dounis

(57) ABSTRACT

A magnetic coupling assembly includes a thermal isolation system that isolates the assembly from a heat source such as a pump coupled to a driven side of the assembly, thereby enabling the assembly to operate at a reduced temperature. The system may include a labyrinth seal that reduces convective heat transfer to the assembly. The seal may include a sealing gap defined between a rotating component and a stationary component. The gap is sized to limit gas conductance therethrough. The system may also include one or more spacers positioned to reduce or eliminate conductive heat transfer from one component to another. The assembly may be utilized in a pump for contactless coupling of a motor shaft to a pump shaft.

20 Claims, 19 Drawing Sheets

(51) Int. Cl.
*F04C 18/02* (2006.01)
*F04C 29/00* (2006.01)
*H02K 5/124* (2006.01)
*H02K 5/18* (2006.01)

(52) U.S. Cl.
CPC ......... *F04C 29/0064* (2013.01); *H02K 5/124* (2013.01); *H02K 5/18* (2013.01)

(56) References Cited

U.S. PATENT DOCUMENTS

| | | | |
|---|---|---|---|
| 5,354,184 | A | 10/1994 | Forni |
| 7,425,121 | B2 | 9/2008 | Wood et al. |
| 9,341,186 | B2 | 5/2016 | Calhoun |
| 2011/0076136 | A1 | 3/2011 | Small et al. |
| 2015/0078927 | A1 | 3/2015 | Forni |

FOREIGN PATENT DOCUMENTS

| | | | | |
|---|---|---|---|---|
| DE | 102015223338 A1 | | 6/2017 | |
| FR | 2766027 A1 | * | 1/1999 | ........... H02K 49/106 |
| GB | 2545062 A | | 6/2017 | |
| WO | WO-2013114921 A1 | * | 8/2013 | ........... H02K 49/108 |

OTHER PUBLICATIONS

Lubin et al., Simple Analytical Expressions for the Force and Torque of Axial Magnetic Couplings. IEEE Transactions on Energy Conversion, Institute of Electrical and Electronics Engineers, 2012, 11 p. 10.1109/TEC.2012.2183372.hal-00673920.

Lubin et al., Experimental and Theoretical Analysis of Axial Magnetic Coupling under Steady-State and Transient Operation. IEEE Transactions on Industrial Electronics, Institute of Electrical and Electronics Engineers, 2014, 61 (8), 9 p. 10.1109/TIE.2013.2266087. hal-00833962.

Jang et al., Torque characteristic analysis and measurement of axial flux-type non-contact permanent magnet device with Halbach array based on 3D analytical method, AIP Advances 7, 056647 (2017), doi.org/10.1063/1.4974494; 9 pages.

Jang et al., Design of Axial Flux Type Permanent Magnet Coupling with Halbach Magnet Array for Optimal Performance Considering Eddy Current Loss Reduction Using 3-D Finite Element Method, International Journal of Engineering & Technology, 7 (3.34) (2018), pp. 184-187; 4 pages.

Reza et al., Semi-Analytical Model for Skewed Magnet Axial Flux Machine, Progress In Electromagnetics Research M, vol. 68, Mar. 12, 2018, pp. 109-117; 9 pages.

Gulec et al., Magnet asymmetry in reduction of cogging torque for integer slot axial flux permanent magnet motors, The Institution of Engineering and Technology, IET Electr. Power Appl., 2014, vol. 8, Iss. 5, pp. 189-198; 10 pages.

Xie et al., Research of Asymmetrical Bidirectional Magnet Skewing Technique in Modular Multi-Stage Axial Flux Permanent Magnet Synchronous Motor, IEEE Transactions on Magnetics, vol. 51, No. 3, Mar. 2015; 5 pages.

PCT Notification of Transmittal of The International Search Report & Written Opinion dated Sep. 20, 2022 for Application No. PCT/US2021/056354; 19 pages.

* cited by examiner

AIR GAP MAGNETIC COUPLING WITH THERMAL ISOLATION

CROSS-REFERENCE TO RELATED APPLICATIONS

This application is the national stage under 35 U.S.C. 371 of International Application No. PCT/US2021/056354, filed on Oct. 22, 2021; the entire contents of which are incorporated by reference herein.

TECHNICAL FIELD

The present invention relates to an air gap magnetic coupling, particularly configured to magnetically couple a motor and a pump. In particular, the invention relates to features configured to thermally isolate the magnetic coupling, particularly on the driven side thereof. The invention also relates to assemblies in which the magnetic coupling may be provided, such as pump assemblies.

BACKGROUND

A shaft coupling is utilized in various applications to transmit power (in particular, to transfer torque) from one shaft (the drive shaft) to another shaft (the driven shaft). As a general example, a shaft coupling may couple a prime mover (e.g., an electric motor) to the movable component (e.g., one or more pump elements) of a device or machine, whereby the power supplied or generated by the prime mover is utilized to drive the movement of the pump elements. Various types of pumps (e.g., scroll pump, rotary vane pump, gear pump, screw pump, Roots-type pump, claw pump, impeller pump, fan, piston pump, etc.) have one or more movable pump elements that require such power.

Many pumping applications require the pump components to be hermetically sealed (i.e., isolated in a fluid-tight or leak-free manner) from the ambient environment outside of the pump. In particular, the driven side of the shaft coupling may need to reside within the confines of the hermetic sealing envelope, as well as the pumping components that act on the working fluid (the liquid or gas being pumped). Helium recirculation is one example where a hermetic vacuum pump is required. It is recognized by persons skilled in the art that hermeticity has two components, which are defined by 1) a leakage rate and 2) a permeation rate. In systems that use helium or other light gases, the hermeticity of the system is usually dominated by the permeation rate of the light gas through the sealing o-rings and any polymer barriers in the system. Typically, the permeation rate can be several orders of magnitude larger than the leakage rate in light gas applications, requiring the selection of special sealing and barrier materials with a low permeation rate. Hermetic pumps may be required to control fluid pressure inside the pump, such as a desired vacuum level in the case of a vacuum pump, and/or to prevent contamination such as by leakage of lubricants, solid particles, and/or the working fluid from the pump. Known components for realizing a hermetic pump add significant cost. Examples include a magnetic (shaft) coupling, an orbiting bellows in the case of a scroll compressor or vacuum pump, a canned motor, and a ferrofluidic seal. It would be desirable to provide a lower-cost solution for a hermetic pump than those currently known, and further which has the potential for both a low leakage rate and low permeation rate for both the system gases and ambient gases (i.e. air).

In addition, many types of shaft couplings are mechanical shaft couplings. That is, they require a direct physical connection between the coupling component(s) on the drive (e.g., motor) side and the coupling component(s) on the driven (e.g., pump head) side. Such a shaft coupling is problematic when utilized with a hermetic pump, as a portion of the shaft coupling must physically cross or pass through the hermetic barrier of the pump. Such an arrangement requires special shaft seals (particularly on the driven side) to maintain the integrity of the hermetic barrier. However, the performance of such shaft seals can be unreliable, they require maintenance, and they can have limited service life.

As an alternative to intrusive mechanical shaft couplings, a magnetic coupling may be utilized. A magnetic coupling includes one or more drive magnets and one or more driven magnets separated by an air gap, thereby establishing magnetic fields in the air gap between the drive magnet(s) and driven magnet(s). The associated magnetic forces are utilized in a known manner to transfer the torque from the drive shaft to the driven shaft without any contact between the drive side and the driven side of the magnetic coupling. This configuration enables a separating wall to be positioned in the air gap between the drive side and the driven side. The separating wall can form a part of a hermetic barrier for a hermetic pump, provided it is made from a material with a low permeation rate for both the working fluid in the system and the ambient gases (e.g., nitrogen, oxygen, water). A metallic material might seem to be an obvious choice for the barrier material except for the fact that an electrically conductive material is disadvantageous in the context of a magnetic coupling. In particular, an electrically conductive material would result in excessive power loss and heat build-up in the hermetic barrier material in the air gap region caused by eddy currents generated by the time-varying magnetic fields in the conductive barrier material. It is therefore critical that the hermetic barrier material in the air gap region of the magnetic coupling be an electrically non-conductive, low-cost material that is also resistant to permeation, especially for light gases such as helium and hydrogen. The hermetic barrier material would also need to resist permeation of water, nitrogen, and oxygen to avoid contamination of the system from atmospheric gases permeating into the system, (e.g., a helium recirculation system). A further requirement of the barrier material is that it have a sufficient structural modulus, yield strength, and low creep rate to prevent excessive deflection or structural failure caused by the pressure differential across the barrier material. It would therefore be desirable to provide a special barrier material that meets one or more, and preferably all, of these potentially conflicting requirements (e.g., low permeation, low cost, non-conductive, high modulus of elasticity, high yield strength, and low creep rate).

As other advantages, a magnetic coupling may eliminate the need for the shaft seals noted above. Also, a magnetic coupling is intrinsically torque-limiting in that it will not transfer torque greater than a certain maximum value ("pull-out" torque), and thus provides self-protection against an overload condition. Further, a magnetic coupling allows for an appreciable amount of tolerance for misalignment between the drive shaft and driven shaft.

Magnetic couplings having radial configurations have been utilized. A radial magnetic coupling includes a ring-shaped outer magnet coaxially surrounding a ring-shaped inner magnet. Both magnets rotate about the central axis of the magnetic coupling, with one driving the rotation of the other. Accordingly, the air gap between the magnets is cylindrical and parallel with the central axis. Radial couplings have been provided with gear pumps and rotary vane pumps. Examples of these configurations are respectively disclosed in U.S. Pat. Nos. 4,111,614 and 7,425,121, the entire contents of which are incorporated by reference herein. However, the radial configuration can add complexity and cost to the pump along with a larger hermetic barrier in comparison to an axial configuration (described below). The larger hermetic barrier typically requires additional surface area in the radial air gap region that increases the permeation rate compared to an axial air gap coupling, as well as creating assembly difficulties that arise from one coupling component tending to attract the other coupling component with a large attractive force during the assembly process.

Magnetic couplings having axial configurations also have been utilized. In axial magnetic coupling, a set of drive magnets and a set of driven magnets are arranged about a common axis of rotation, and are separated by an axial air gap. Examples of these configurations are disclosed in Lubin et al., Simple Analytical Expressions for the Force and Torque of Axial Magnetic Couplings. IEEE Transactions on Energy Conversion, Institute of Electrical and Electronics Engineers, 2012, 11 p. 10.1109/TEC.2012.2183372. hal-00673920; Lubin et al., Experimental and Theoretical Analysis of Axial Magnetic Coupling under Steady-State and Transient Operation. IEEE Transactions on Industrial Electronics, Institute of Electrical and Electronics Engineers, 2014, 61 (8), 9 p. 10.1109/TIE.2013.2266087. hal-00833962; Jang et al., Torque characteristic analysis and measurement of axial flux-type non-contact permanent magnet device with Halbach array based on 3D analytical method, AIP Advances 7, 056647 (2017), doi.org/10.1063/1.4974494; and Jang et al., Design of Axial Flux Type Permanent Magnet Coupling with Halbach Magnet Array for Optimal Performance Considering Eddy Current Loss Reduction Using 3-D Finite Element Method, International Journal of Engineering & Technology, 7 (3.34) (2018) 184-187; the entire contents of each of which are incorporated by reference herein. An axial air gap magnetic coupling could potentially offer a simpler and lower cost solution in comparison to a radial magnetic coupling. However, axial magnetic couplings of known designs produce a significant axial force. In a typical application such as a pump, this axial force must be reacted by the bearings of the system associated with the transfer of motorized power to the load (e.g., the pump head), such as motor bearings and pump shaft bearings. However, the bearings typically provided are not designed to bear the large axial forces generated by an axial magnetic coupling. Consequently, the incorporation of an axial magnetic coupling into the typical application would require non-standard components to accommodate such axial forces, and thereby offset any cost reduction that might be realized with the utilization of the axial magnetic coupling.

In view of the foregoing, there is an ongoing need for improved magnetic couplings and the implementation of magnetic couplings to pumping applications.

In addition, it is known that the rotating component(s) of a pump can generate a significant amount of heat energy. If the pump is driven by a magnetic coupling, this heat energy can be transferred to the magnetic coupling. Excessive heating of the magnetic coupling can impair its operation. For example, the strength of the magnetic field will be significantly reduced at high temperatures, for example above 80° C. Pump configurations often provide means for cooling certain internal regions of the pump assembly, such as a fan for circulating cooling air or a system for circulating a heat transfer liquid. However, such cooling means are not configured to cool a magnetic coupling, and the cooling of a magnetic coupling has not been contemplated in known pump configurations. Therefore, there is a need to address this problem as well.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a magnetic coupling assembly includes: a drive shaft rotatable on a drive axis; a driven shaft rotatable on the drive axis; a drive magnet assembly coupled to the drive shaft and rotatable therewith; a driven magnet assembly coupled to the driven shaft and rotatable therewith, and spaced from the drive magnet assembly by an air gap; a first housing coupled to the driven shaft and rotatable therewith, the first housing comprising at least one first seal surface; a second housing disposed about the drive axis and surrounding the first housing, the second housing comprising at least one second seal surface, wherein the first housing and the second housing at least partially define a chamber disposed about the drive axis; and a labyrinth seal comprising a sealing gap formed between the at least one first seal surface and the at least one second seal surface and fluidly communicating with the chamber, wherein: the chamber is disposed axially between the sealing gap and the driven magnet assembly; and the sealing gap has a size effective to limit gas conductance therethrough and thereby thermally isolate the chamber from a region external to the sealing gap and the chamber.

According to another embodiment, a magnetic coupling assembly includes: a drive shaft rotatable on a drive axis; a driven shaft rotatable on the drive axis; a drive magnet assembly coupled to the drive shaft and rotatable therewith; a driven magnet assembly coupled to the driven shaft and rotatable therewith, and spaced from the drive magnet assembly by an air gap, wherein: at least one of the drive magnet assembly or the driven magnet assembly comprises a plurality of magnets circumferentially spaced from each other about the drive axis; the magnets comprise respective inside faces facing the air gap; and the inside face of each magnet is asymmetrical relative to a radial axis passing through the magnet.

According to another embodiment, a pump assembly includes: a magnetic coupling assembly according to any of the embodiments disclosed herein; a pump head comprising a fluid inlet and a fluid outlet; and a pumping stage disposed in the pump head and communicating with the fluid inlet and the fluid outlet, the pumping stage comprising a pump element communicating with the driven shaft and movable thereby, wherein movement of the drive shaft drives movement of the pump element via the magnetic coupling assembly, and the pumping stage is configured to pump fluid from the fluid inlet to the fluid outlet in response to the movement of the pump element.

According to another embodiment, a method for operating a magnetic coupling assembly includes: providing the magnetic coupling assembly with a drive magnet assembly and a driven magnet assembly spaced from each other by an air gap, wherein the drive magnet assembly and the driven magnet assembly are coupled by a magnetic field; providing a first housing coupled to the driven shaft and rotatable therewith, the first housing comprising at least one first seal surface; providing a second housing disposed about the drive axis and surrounding the first housing, the second housing comprising at least one second seal surface, wherein the first housing and the second housing at least partially define a chamber disposed about the drive axis: providing a labyrinth seal comprising a sealing gap formed between the at least one first seal surface and the at least one second seal surface and fluidly communicating with the chamber, wherein the chamber is disposed axially between the sealing gap and the driven magnet assembly; and rotating the drive magnet assembly about the drive axis to drive rotation of the driven magnet assembly about the drive axis via the magnetic coupling, and to drive rotation of the first seal surface relative to the second seal surface, wherein, during the rotating, the scaling gap has a size effective to limit gas conductance therethrough and thereby thermally isolate the chamber from a region external to the sealing gap and the chamber, and from which region heat energy propagates toward the sealing gap.

Additional embodiments of the magnetic coupling assembly, pump assembly, and method will now be summarized.

In an embodiment, the size of the sealing gap has a dimension in a range from 0.001 inch to 0.04 inch, from 0.004 inch to 0.01 inch, or from 0.001 inch to 0.004 inch.

In an embodiment, the gap is annular, and the dimension is a radial dimension relative to the drive axis.

In an embodiment, the first housing comprises an outer surface and at least one rib disposed on the outer surface, and the at least one rib faces the driven magnet assembly and thermally isolates the driven magnet assembly from a remaining portion of the first housing.

In an embodiment, the magnetic coupling assembly comprises a shim disposed between and in contact with the driven magnet assembly and the at least one rib, wherein the shim thermally isolates the driven magnet assembly from the at least one rib.

In an embodiment, the second housing comprises an outer surface and a plurality of cooling fins extending outwardly from the outer housing.

In an embodiment, the magnetic coupling assembly comprises a counterweight coupled to the first housing and rotatable therewith.

In an embodiment, the second housing surrounds the driven magnet assembly.

In an embodiment, the magnetic coupling assembly comprises a structural boundary disposed in the air gap.

In an embodiment, the structural boundary is attached to or part of the second housing, and the structural boundary and the second housing cooperatively enclose the driven magnet assembly.

In an embodiment, the magnetic coupling assembly comprises a pump element communicating with the driven shaft and movable thereby, wherein the sealing gap is configured to thermally isolate the chamber from heat energy emitted from the pump element.

In an embodiment, the sealing gap is a first scaling gap, and the labyrinth seal further comprises a second sealing gap and defines a fluid path through the first sealing gap, through the second sealing gap, and into the chamber, and wherein the fluid path has one or more fluid contraction regions and/or one or more fluid expansion regions.

In an embodiment, the first housing comprises a third seal surface, the second housing comprises a fourth seal surface, and the second sealing gap is formed between the third seal surface and the fourth seal surface.

In an embodiment, the first housing comprises a first wall, the second housing comprises a second wall nested with the first wall, and the second sealing gap is formed between the first wall and the second wall.

In an embodiment, the pump element comprises an orbiting scroll blade; the pumping stage further comprises a stationary scroll blade nested with the orbiting scroll blade; and the orbiting scroll blade is configured to move in an orbiting manner relative to the stationary scroll blade in response to rotation of the driven shaft, to create at least one moving pocket between the orbiting scroll blade and the stationary scroll blade effective to pump fluid.

In an embodiment, the pumping stage further comprises a crank positioned in eccentric relation to the driven shaft and configured to move in an orbiting manner in response to rotation of the driven shaft, and the orbiting scroll blade is coupled to the crank.

In an embodiment, the method further comprises providing a pump element communicating with the driven shaft and movable thereby, wherein the sealing gap thermally isolates the chamber from heat energy emitted from the pump element.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
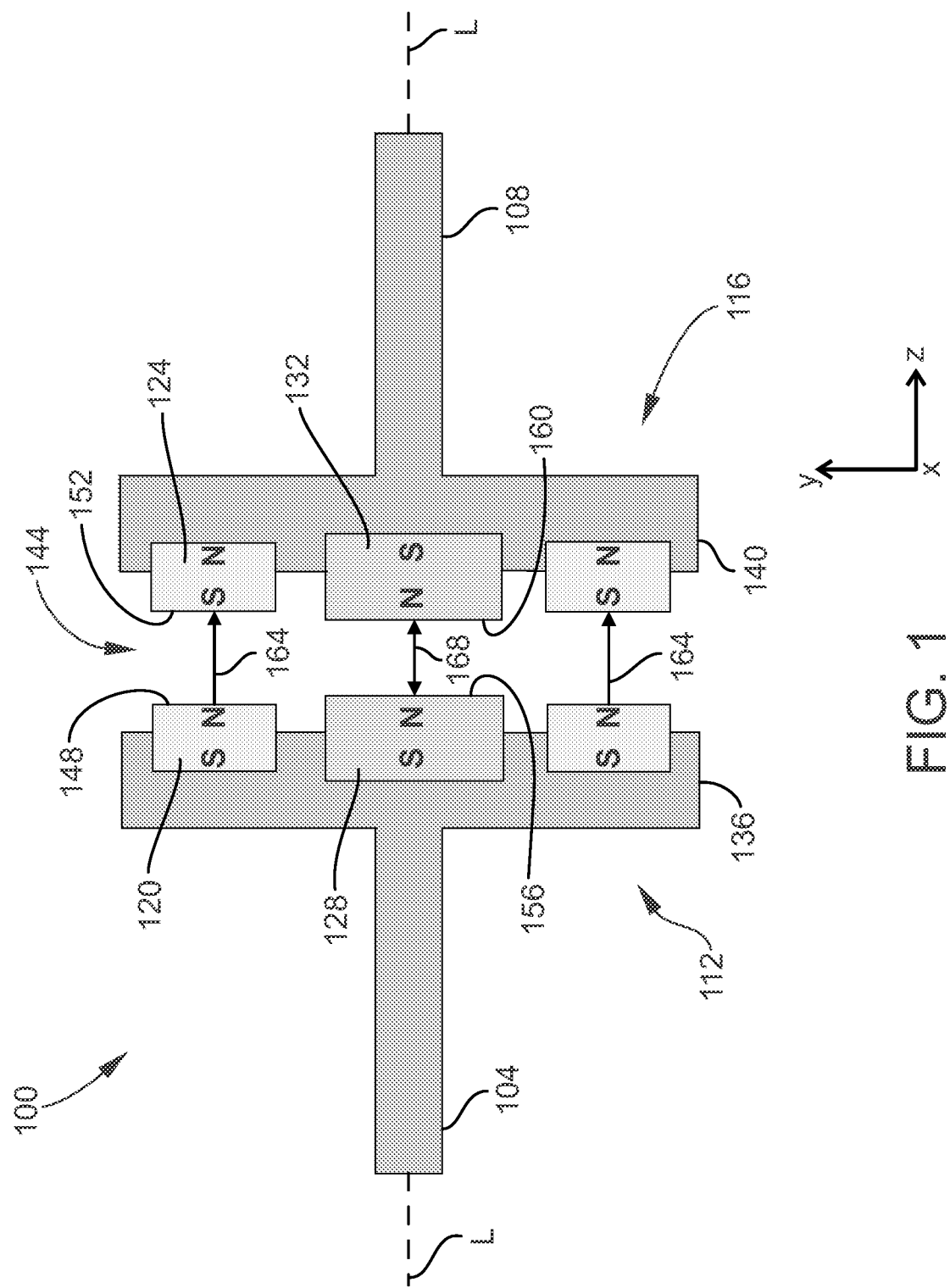
FIG. 1 is a schematic cross-sectional view of an example of a (balanced) axial magnetic coupling assembly according to an embodiment of the present disclosure.

FIG. 1 is a schematic cross-sectional view of an example of a ("balanced" or "counterbalanced" as defined herein) axial magnetic coupling assembly 100 according to an embodiment of the present disclosure. For reference purposes, the axial magnetic coupling assembly 100 may be considered as being arranged along a drive axis L, which corresponds to the axis of rotation of the axial magnetic coupling assembly 100, and may further correspond to the central, longitudinal axis of the axial magnetic coupling assembly 100. Also, for reference purposes, FIG. 1 includes an arbitrarily positioned Cartesian (x-y-z) frame of reference. In this example, the drive axis L corresponds to the z-axis, and the transverse plane orthogonal to the drive axis L corresponds to the x-y plane. In the context of the present disclosure, the term "axial" relates to the drive axis L or a direction generally parallel to the drive axis L.

The axial magnetic coupling assembly 100 generally includes a drive (driving) shaft 104 and a driven shaft 108, both of which are rotatable on the drive axis L. The axial magnetic coupling assembly 100 also generally includes a drive (driving) magnet assembly 112 coupled to the drive shaft 104 and thereby rotatable with the drive shaft 104, and a driven magnet assembly 116 coupled to the driven shaft 108 and thereby rotatable with the driven shaft 108. The drive magnet assembly 112 includes a drive magnet 120, and the driven magnet assembly 116 includes a driven magnet 124. The drive magnet 120 and the driven magnet 124 each may include one or more distinct magnets. That is, the drive magnet 120 may include a single drive magnet or a plurality of drive magnets, and the driven magnet 124 may include a single driven magnet or a plurality of driven magnets. In the present embodiment, the drive magnet assembly 112 includes a plurality of peripheral drive (driving) magnets 120 arranged in an array or pattern in the transverse plane. Similarly, the driven magnet assembly 116 includes a plurality of peripheral driven magnets 124 arranged in an array or pattern in the transverse plane. Only one diametrically opposite pair of drive magnets 120, and only one diametrically opposite pair of driven magnets 124, are shown in FIG. 1.

According to an aspect of the present disclosure, the drive magnet assembly 112 further includes a first (drive-side) balancing magnet 128 and the driven magnet assembly 116 further includes a second (driven-side) balancing magnet 132, both of which are centrally positioned on the drive axis L. The drive magnets 120 coaxially surround the first balancing magnet 128, and the driven magnets 124 coaxially surround the second balancing magnet 132. The first balancing magnet 128 and the second balancing magnet 132 are described further below.

In an embodiment, the drive magnet(s) 120, driven magnet(s) 124, first balancing magnet 128, and second balancing magnet 132 are permanent magnets. Thus, these magnets may be composed of, for example, a suitable alloy such as (permanently magnetized) neodymium (i.e., neodymium alloyed primarily with iron and boron), alnico (i.e., iron alloyed primarily with aluminum, nickel, and cobalt), a hard ferrite (i.e., an iron oxide-containing ceramic), etc.

The drive magnet assembly 112 may further include a drive magnet support structure 136. The drive magnet support structure 136 is configured to couple the drive magnet assembly 112 to the drive shaft 104, and to support and fix the positions of the drive magnets 120 and the first balancing magnet 128 relative to each other and to the drive axis L. Thus, the drive magnets 120 are mounted to (e.g., attached to, secured to, or otherwise retained or held by) the drive magnet support structure 136, and are thereby coupled to and rotatable about the drive shaft 104. Similarly, the driven magnet assembly 116 may further include a driven magnet support structure 140. The driven magnet support structure 140 is configured to couple the driven magnet assembly 116 to the driven shaft 108, and to support and fix the positions of the driven magnets 124 and the second balancing magnet 132 relative to each other and to the drive axis L. Thus, the driven magnets 124 are mounted to (e.g., attached to, secured to, or otherwise retained or held by) the driven magnet support structure 140, and are thereby coupled to and rotatable about the driven shaft 108. For all such purposes, the drive magnet support structure 136 and the driven magnet support structure 140 each may include one or more structural components as needed. Moreover, depending on the configuration of the various magnets, all or part of the drive magnet support structure 136 and the driven magnet support structure 140 may serve as a magnetic or magnetizable yoke to complete the circuit for the magnetic flux of corresponding magnets. For example, all or part of the drive magnet support structure 136 and the driven magnet support structure 140 may be composed of a ferromagnetic material such as soft iron, nickel, cobalt, etc., and certain alloys thereof.

The drive magnet assembly 112 and the driven magnet assembly 116 are spaced from each other (along the drive axis L) by an axial gap 144, for example an air gap. The array of drive magnets 120 and the array of driven magnets 124 face each other across the axial gap 144. Likewise, the first balancing magnet 128 and the second balancing magnet 132 face each other across the axial gap 144. Specifically, the drive magnets 120 have (first) inside faces 148 facing the axial gap 144, the driven magnets 124 have (second) inside faces 152 facing the axial gap 144 and facing the drive magnets 120, the first balancing magnet 128 has a (first) inside face 156 facing the axial gap 144, and the second balancing magnet 132 has a (second) inside face 160 facing the axial gap 144 and facing the first balancing magnet 128.

Figure 2A:
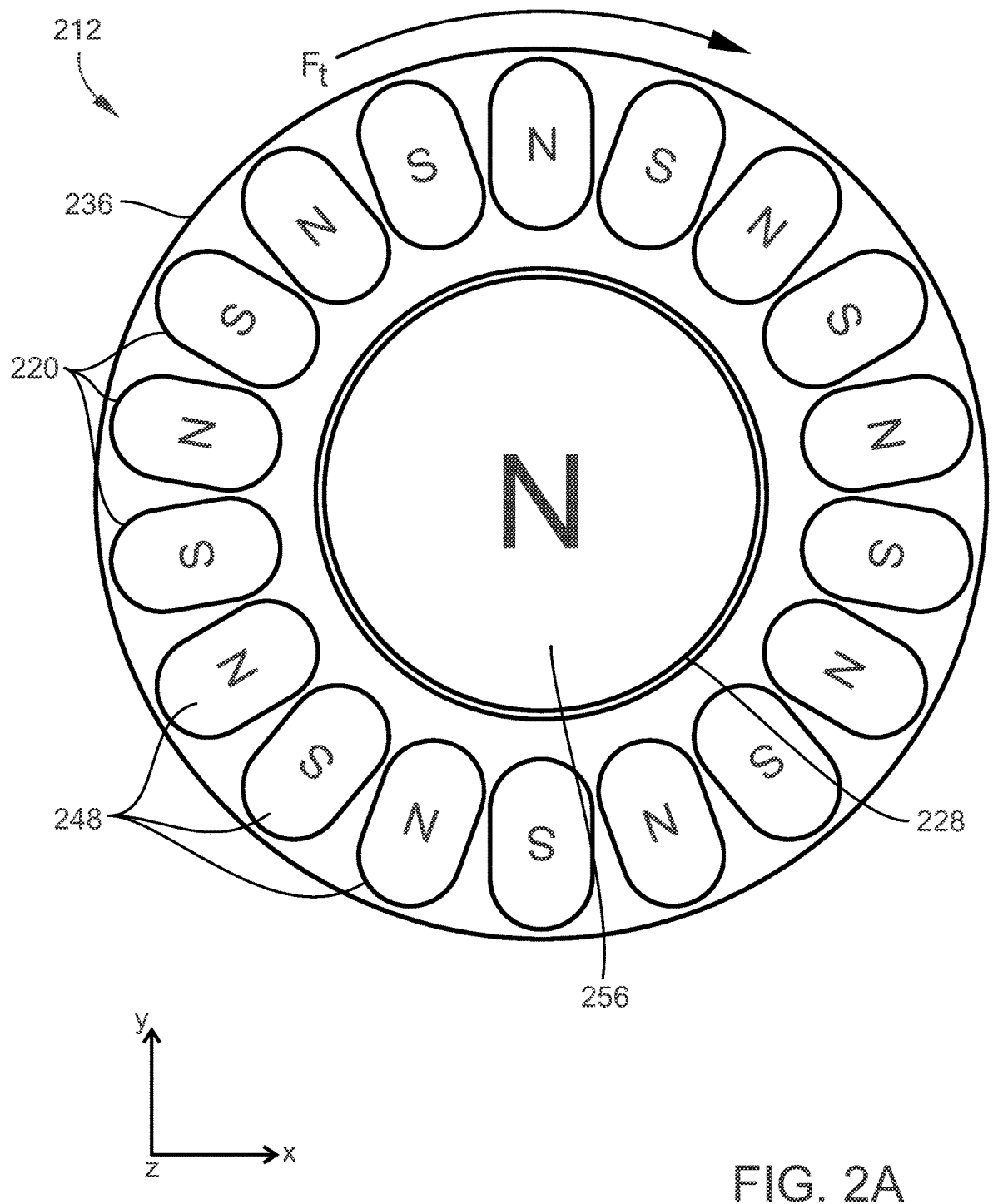
FIG. 2A is a schematic plan view of an example of a magnet assembly according to an embodiment of the present disclosure.

FIG. 2A is a schematic plan view of an example of a magnet assembly 212 according to an embodiment. The magnet assembly 212 includes a balancing magnet 228 positioned on the drive (central) axis, and a plurality of peripheral magnets 220 circumferentially spaced from each other about the drive axis (at a radial distance from the drive axis) and coaxially surrounding the balancing magnet 228. The balancing magnet 228 and peripheral magnets 220 are mounted to and supported by an appropriately configured magnet support structure 236 that can be coupled to a shaft for rotation with the shaft. To provide balanced and uniform (and rotationally symmetric) magnetic fields and axial forces, the peripheral magnets 220 all have the same size, shape, and position relative to each other. As to the latter, the peripheral magnets 220 are circumferentially spaced at equal distances from each other and with the same angular orientation relative to the drive axis, and are radially spaced at equal distances from the drive axis and thus from the centrally located balancing magnet 228. Generally, the peripheral magnets 220 may have any shape, which may be rounded, polygonal, or have a combination of rounded and polygonal (e.g., straight-edged features). In the illustrated embodiment, by way of example only, the peripheral magnets 220 have racetrack shapes.

FIG. 2A in particular is a plan view of the inner side, or gap side, of the magnet assembly 212 (namely, the side facing the axial gap when assembled as part of an axial magnetic coupling), thus showing inside faces 248 of the peripheral magnets 220 and an inside face 256 of the balancing magnet 228. In an embodiment, the peripheral magnets 220 and the balancing magnet 228 are configured (e.g., magnetized) as north-south (N-S) magnetic dipoles. The peripheral magnets 220 and the balancing magnet 228 are oriented such that the north and south poles are located on the inside faces 248 and 256 and on the axially opposite outside faces. By this configuration, the magnetic flux is directed axially through the thickness of the peripheral magnets 220 and the balancing magnet 228 (namely, in the z-direction through the drawing sheet). As illustrated, the peripheral magnets 220 are circumferentially arranged with alternating polarities about the drive axis. Thus, for each peripheral magnet 220, the polarity (e.g., N) at the inside face 248 is opposite to the polarity (e.g., S) at the inside faces 248 of the peripheral magnets 220 adjacent to that peripheral magnet 220.

Figure 2B:
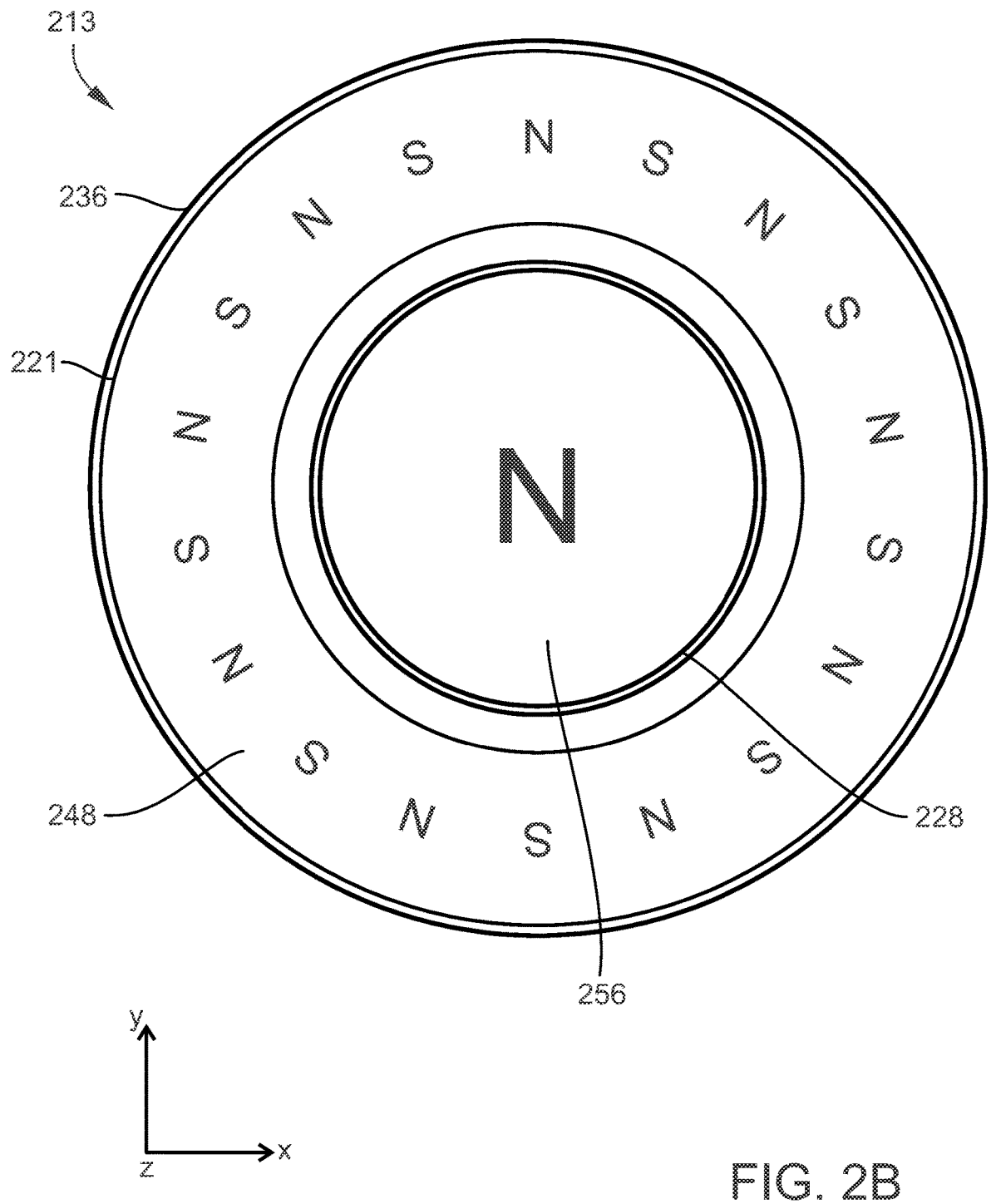
FIG. 2B is a schematic plan view of an example of a magnet assembly according to another embodiment of the present disclosure.

As an alternative, FIG. 2B is a schematic plan view of an example of a magnet assembly 213 according to another embodiment. The magnet assembly 213 includes a balancing magnet 228 positioned on the drive (central) axis, and a peripheral magnet 221. The balancing magnet 228 and peripheral magnet 221 may be mounted to and supported by an appropriately configured magnet support structure 236 that can be coupled to a shaft for rotation with the shaft. In this embodiment, instead of being an array of individual magnets, the peripheral magnet 221 (as the drive magnet or the driven magnet) may be realized as a single (continuous, contiguous, unitary, monolithic, etc.) annular (i.e., ring-shaped or donut-shaped) magnet positioned at a radial distance from the drive axis and coaxially surrounding the balancing magnet 228. Such an annular structure may be magnetized with a plurality of circumferentially arranged magnetic (north-south) dipoles with alternating polarities parallel to the drive axis, as appreciated by persons skilled in the art. In this embodiment, the support structure 236 and the peripheral magnet 221 may be combined into a single component. Likewise, the balancing magnet 256 could be combined into this single component as well.

In an embodiment, the magnet assembly 212 or 213 is representative of both the drive magnet assembly 112 and the driven magnet assembly 116 illustrated in FIG. 1. That is, the drive magnet assembly 112 and the driven magnet assembly 116 may have the same configuration, or may be mirror images of each other. In such embodiment, the peripheral magnet(s) 220 or 221 is/are representative of both the drive magnets 120 and the driven magnets 124. Additionally, the balancing magnet 228 is representative of both the first balancing magnet 128 and the second balancing magnet 132. Alternatively, one of the drive magnet assembly 112 or the driven magnet assembly 116 may have a multi-magnet configuration such as illustrated in FIG. 2A, while the other has a single-magnet configuration such as illustrated in FIG. 2B.

The drive magnet assembly 112 and the driven magnet assembly 116, particularly the array of drive magnets 120 and the array of driven magnets 124, are configured to drive rotation of the driven magnet assembly 116 (and thus the driven magnets 124) in response to rotation of the drive magnet assembly 112 (and thus the drive magnets 120). An example of such configuration is described above in conjunction with FIGS. 1 and 2. In practice, the axial magnetic coupling assembly 100 is installed (coupled) between a prime mover or source or power such as a (for example electric) motor and a load that consumes the power such as a movable pump element (e.g., an orbiting scroll, a rotor, etc.) that is part of a pumping mechanism. In this case, the drive shaft 104 is (or is coupled to) the motor shaft, and the driven shaft 108 is (or is coupled to) the pump element. Upon rotation of the drive shaft 104 (e.g., as powered by a motor), the drive magnet assembly 112 rotates with the drive shaft 104. Due to the contactless magnetic coupling established between the drive magnets 120 and the driven magnets 124 across the axial gap 144, the rotation of the drive magnet assembly 112 drives (or induces) rotation of the driven magnet assembly 116. The rotation of the driven magnet assembly 116 thereby rotates the driven shaft 108 couple thereto, and consequently drives motion of a pump element or other loads coupled to the driven shaft 108.

The rotation caused by the magnetic coupling is due to a relative angular displacement, d, about the drive axis L of the driven coupling 116 relative to the drive coupling 112. This relative angular displacement, d, results in a tangential drive force, Ft, about the drive axis L from the drive coupling's drive magnets 120 to the driven coupling's driven magnets 124 (as depicted in FIG. 2A) resulting in a drive torque, T. Consequently, as the drive magnets 120 rotate (in the transverse or x-y plane) in a certain (clockwise or counterclockwise) direction, the drive magnets 120 pull on or drag the driven magnets 124 to rotate in the same direction. As this relative angular displacement, d, increases there is an increase in drive torque, T, but only up to a point where the drive torque reaches a maximum value, Tmax, (i.e. "pull-out torque") dictated by the magnetic coupling's design parameters (i.e. diameter, air gap, number of pole pairs, magnetic strength, etc.). If the "pull-out torque" of the magnetic coupling 100 is exceeded, the magnetic coupling 100 will slip into an asynchronous mode and may require the pump to which the magnetic coupling 100 is coupled to be stopped and restarted for proper engagement and synchronous operation of the magnetic coupling 100. Along with the beneficial drive torque, T, there is an axial attractive force, FA, across the axial gap 144 between the drive magnets 120 and driven magnets 124 which decreases as the relative angular displacement, d, increases. For example, FIG. 1 depicts by arrows 164 the axial attractive force between the north poles at the inside faces 148 of two drive magnets 120 and, respectively, the south poles at the inside faces 152 of two corresponding driven magnets 124. Likewise, an axial attractive force in the direction of arrows 164 is generated between the south poles at the inside faces 148 of other drive magnets 120 and the north poles at the inside faces 152 of other driven magnets 124. Typically, this undesirable axial attractive force, FA, at full load operation up to the "pull-out torque" is still a relatively large fraction of the maximum axial attractive force, FAmax, (i.e., the axial force when the relative angular displacement, d, is zero).

Figure 8:
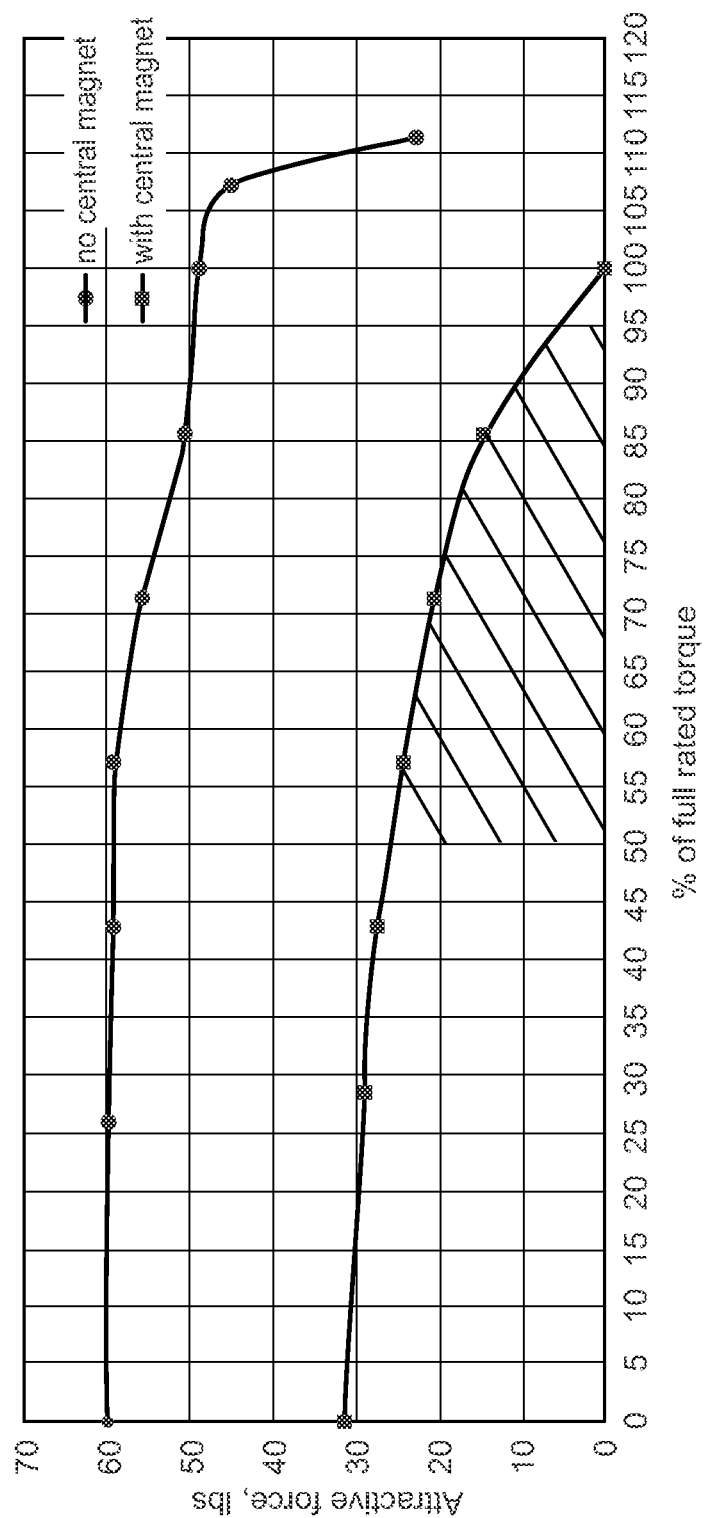
FIG. 8 is a plot of attractive force (in pounds, lbs) as a function of percent (%) of full rated torque generated by an axial magnetic coupling, in a case where the coupling includes balancing magnets according to the present disclosure as compared to a case where the coupling does not include balancing magnets.

FIG. 8 shows a relationship between the beneficial drive torque, T, and the undesirable axial force, FA, as experimentally determined by the inventor. As appreciated by persons skilled in the art, the drive torque T and axial attractive force FA can also be calculated theoretically (as a function of the relative angular displacement, d,) from the magnetic B field and an integration of the resulting Maxwell Stress Tensor over a closed surface containing either the drive or driven coupling. The theory shows that there needs to be a helical twisting of the magnetic B field in the air gap about the drive axis L caused by the relative angular displacement, d, in order to generate a drive torque between the drive and driven coupling. The hatched area in FIG. 8 corresponds to a typical operating range for a scroll vacuum pump. It is evident that the counterbalancing achieved by the present teachings is able to drastically reduce the axial force. The force reduction is to a point where the relevant bearings of the pumping system can react the axial force without a significant loss of life. Bearing life is typically inversely proportional to roughly the cube of the load. Hence, even a reduction in bearing load by a factor of 2 (such as shown in FIG. 8) may result in an increase in bearing life by a factor of 8.

As noted in the Background section, depending on the physical size and magnetic strength (or flux density) of the drive magnets 120 and driven magnets 124 in a given axial magnetic coupling assembly 100, the axial attractive forces generated between the drive magnet assembly 112 and the driven magnet assembly 116 can be large. The system in which the axial magnetic coupling assembly 100 operates must be able to support these large axial attractive forces by deploying suitable load-bearing components such as bearings (e.g., axial thrust bearings, roller bearings designed to react axial forces, bushings, etc.). According to an aspect of the present disclosure, the first balancing magnet 128 and the second balancing magnet 132 are provided to counteract the axial attractive forces by generating an on-axis, counterbalancing axial repulsive force, as depicted by an arrow 168 in FIG. 1. That is, the first balancing magnet 128 and the second balancing magnet 132 are configured to generate an axial repulsive force between the first balancing magnet 128 and the second balancing magnet 132. The axial repulsive force is effective to counterbalance the axial attractive force(s) existing in and/or developed by the axial magnetic coupling assembly 100. Depending on the embodiment, the axial repulsive force may be large enough to completely balance the axial attractive forces and thereby effectively zero out the net axial force produced by the axial magnetic coupling assembly 100 in operation, or to at least partially balance the axial attractive forces and thereby effectively reduce the net axial force produced by the axial magnetic coupling assembly 100 in operation. In either case, the counterbalancing axial repulsive force provided by the first balancing magnet 128 and the second balancing magnet 132 is advantageous because it reduces the axial load required to be borne by the system associated with the axial magnetic coupling assembly 100, thereby avoiding any requirement for costly and/or complex load-bearing components.

Accordingly, in the context of the present disclosure, the term "counterbalance" (or even the term "balance") encompasses providing an offset or opposing force or forces to the axial attractive forces effective to either partially balance (and significantly partially balance if desired) or fully balance the axial attractive forces, and thereby either reduce (and significantly reduce if desired) or eliminate the net axial force produced by the axial magnetic coupling assembly 100 in operation. Thus, depending on the embodiment, the counterbalancing axial repulsive force may be less than, equal to, or greater than the axial attractive force(s) being offset or opposed by the first balancing magnet 128 and second balancing magnet 132. FIG. 8 (discussed above) shows a typical reduction in axial load with and without a central balancing magnet as a percentage of the maximum drive torque of the coupling (i.e. "pull-out torque").

As noted above, in the embodiment illustrated in FIGS. 1 and 2, the first balancing magnet 128 and the second balancing magnet 132 have magnetic dipole configurations, with the magnetic field lines running through the axial thicknesses of the first balancing magnet 128 and the second balancing magnet 132. In this case, the first balancing magnet 128 and the second balancing magnet 132 are oriented such that the polarity of the first balancing magnet 128 at its inside face 156 is the same as the polarity of the second balancing magnet 132 at its inside face 160, thereby generating the axial repulsive force across the axial gap 144 between the first balancing magnet 128 and the second balancing magnet 132. Thus, in the illustrated example, the respective north poles of the first balancing magnet 128 and the second balancing magnet 132 face each other across the axial gap 144. As an alternative, the orientation of the first balancing magnet 128 and the second balancing magnet 132 could be reversed such that their respective south poles faced each other to generate the same or similar axial repulsive force.

Figure 3:
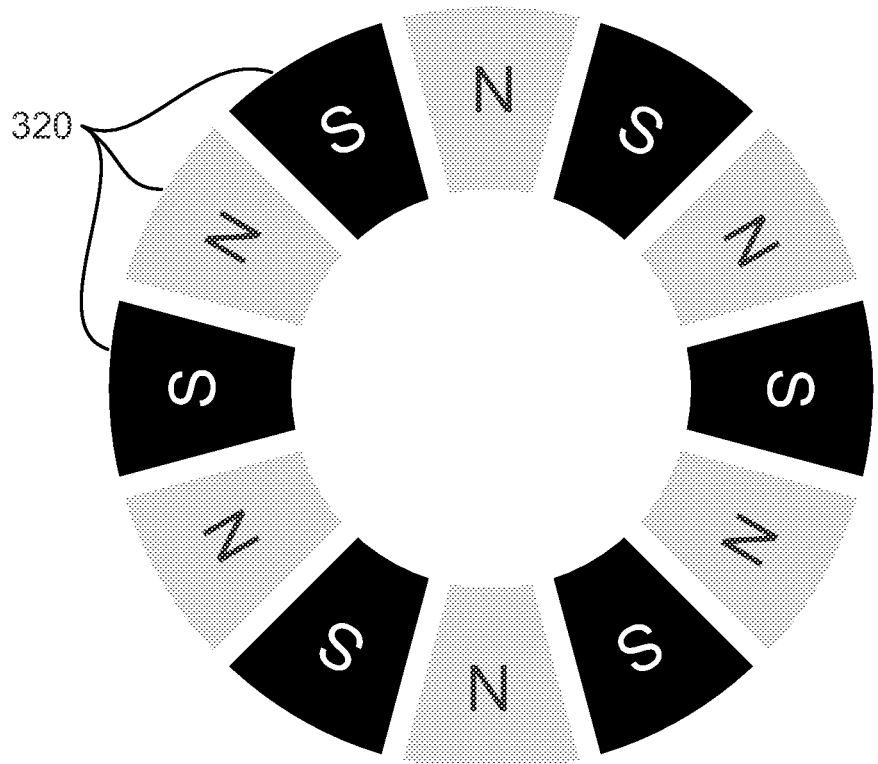
FIG. 3 is a schematic plan view of an example of an array of peripheral magnets according to another embodiment of the present disclosure.

FIG. 3 is a schematic plan view of an example of an array of peripheral magnets 320 according to another embodiment. Here, the peripheral magnets 320 are wedge-shaped, or shaped as truncated pie slices. In an embodiment, the peripheral magnets 320 are representative of both the drive magnets 120 and the driven magnets 124. Alternatively, as described above, the magnetic field generated by the array of peripheral magnets 320 could be achieved by a single annular (e.g., donut-shaped) magnet that is magnetized with a similar number of peripherally spaced alternating north-south dipoles.

Figure 4:
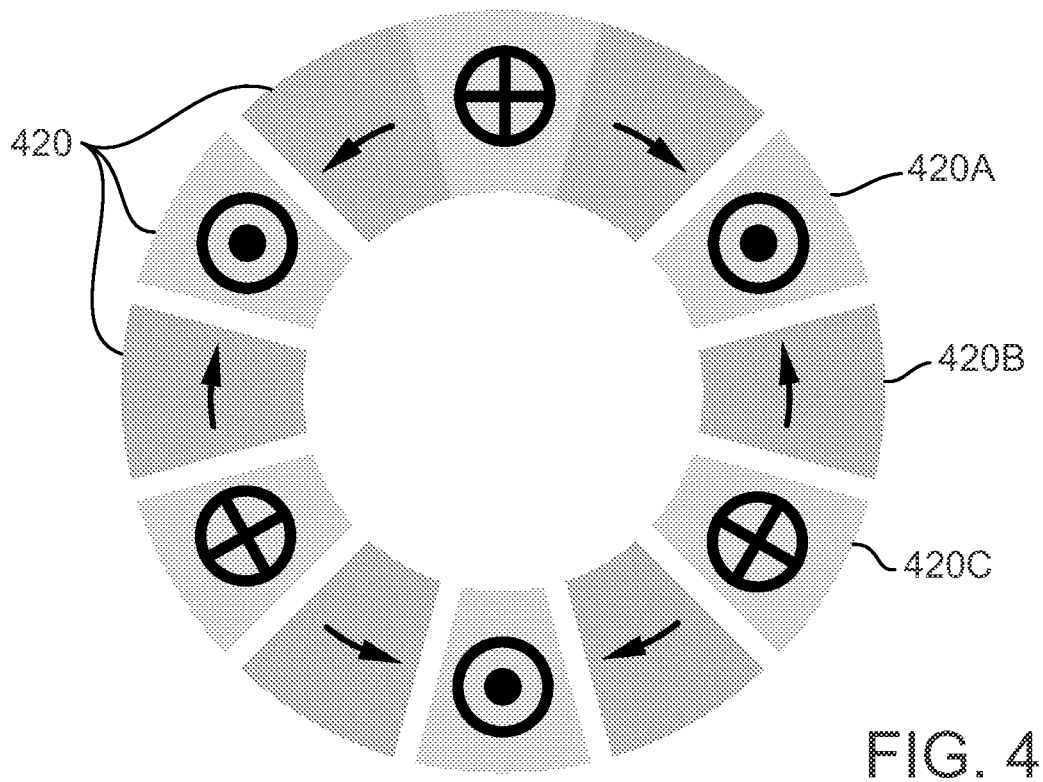
FIG. 4 is a schematic plan view of an example of an array of peripheral magnets according to another embodiment of the present disclosure.

FIG. 4 is a schematic plan view of an example of an array of peripheral magnets 420 according to another embodiment. This embodiment differs from those illustrated in FIGS. 1-3 in that the peripheral magnets 420 are configured as a Halbach array. Halbach arrays are known to persons skilled in the art, and thus need not be described in detail herein. Briefly, in a Halbach array, the peripheral magnets 420 are permanent magnets exhibiting, from one magnet to the next, a spatially rotating pattern of magnetization (or magnetic flux distribution). Thus, in the simplified schematic view of FIG. 4, the magnetization (and orientation of the magnetic field) is directed out of the transverse plane (the plane of the drawing sheet) in magnet 420A, as depicted by the dot-in-circle symbol. The magnetization has components directed or tilted in one angular direction (e.g., counterclockwise) in magnet 420B, as depicted by the arrow. The magnetization is directed into the transverse plane in magnet 420C, as depicted by the cross-in-circle symbol. The magnetization has components directed or tilted in the other angular direction (e.g., clockwise) in magnet 420D, as depicted by the arrow. This pattern repeats around the remainder of the array. The pattern results in one side of the array having a significantly strengthened magnetic field (relative to the other side) while the opposite side of the array has a near-zero strength (or nearly canceled) magnetic field. In an embodiment, the peripheral magnets 420 may be utilized as both the drive magnets 120 and the driven magnets 124, with the strong sides facing each other across the axial gap 144. The Halbach array may be preferable to the more common alternating polarity array shown in FIG. 2 in certain cases, such as where for a given magnet size the Halbach array provides a stronger magnetic field (and a stronger magnetic field is desired), or where the weaker side of the Halbach array enables a simpler design of the supporting or backing structure of the drive/driven magnet assembly 112/116.

Figure 5:
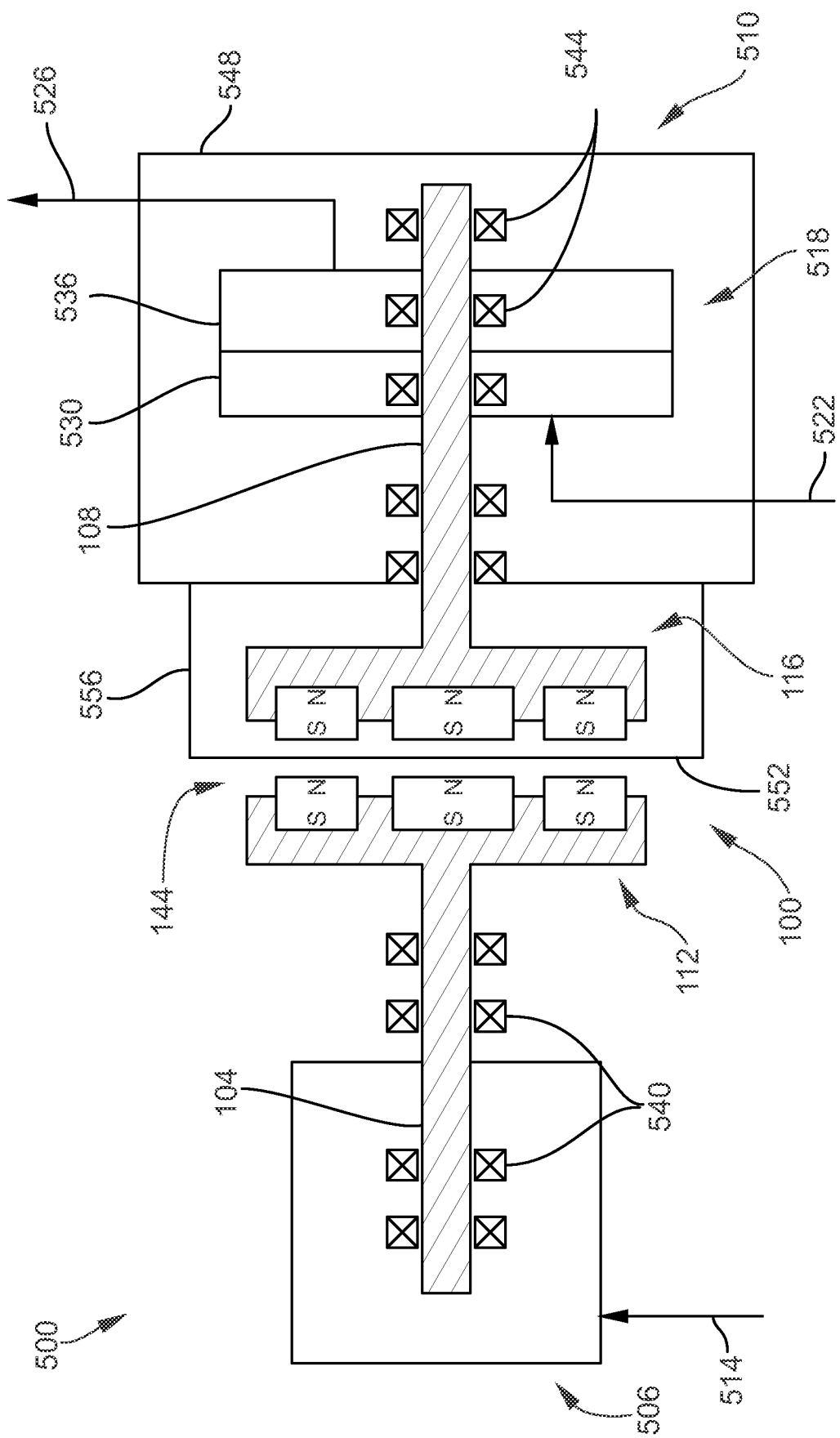
FIG. 5 is a schematic view of an example of a pump (or pumping) assembly according to an embodiment of the present disclosure.

FIG. 5 illustrates one non-limiting example of a system-level or apparatus-level implementation of the subject matter disclosed herein. Specifically, FIG. 5 is a schematic view of an example of a pump (or pumping) assembly 500 according to an embodiment. The pump assembly 500 includes a (balanced) axial magnetic coupling assembly according to any of the embodiments disclosed herein, such as the axial magnetic coupling assembly 100 described above in conjunction with FIGS. 1-4.

The pump assembly 500 generally may include a suitable motor 506 disposed on the drive side of the axial magnetic coupling assembly 100, and a pump head (assembly) 510 disposed on the driven side of the axial magnetic coupling assembly 100. As described above, the axial magnetic coupling assembly 100 intercouples the motor 506 and the pump head 510 in a contactless manner. The motor 506 is configured to generate rotational power and transfer it to the drive shaft 104, which is or is coupled to a motor shaft of the motor 506. The axial magnetic coupling assembly 100 is configured to transfer the rotational power from the drive shaft 104 to the driven shaft 108, which is or is coupled to a pump shaft of the pump head 510, via the drive magnet assembly 112 and the driven magnet assembly 116 as described above. The driven shaft 108 drives the motion of one or more movable components of the pump head 510 (e.g., movable pump elements), which depend on the type or configuration of the pump head 510. Depending on the type of pump element, its movement may be any combination of orbiting, rotation, and/or translation in any or all of six degrees of freedom.

The motor 506 generally may be any suitable motor such as an electric motor. Accordingly, the motor 506 is connected to a suitable power input 514 such as an electrical power input.

The pump head 510 generally may include one or more pumping stages 518 communicating with a pump inlet 522 and a pump outlet 526. The pump inlet 522 schematically represents one or more fluid conducting components (pipes, passages, chambers, valves, etc.) utilized to supply fluid to the pumping stage 518, i.e., the working fluid to be pumped, which may be a gas or a liquid depending on the embodiment. The pump outlet 526 schematically represents one or more fluid conducting components (pipes, passages, chambers, valves, etc.) utilized to conduct outputted fluid away from the pumping stage 518. Generally, the pump inlet 522 is associated with the low-pressure side of the pumping stage 518, and the pump outlet 526 is associated with the high-pressure side of the pumping stage 518. Generally, no limitation is placed on the type or configuration of the pump head 510. The pump head 510 may represent a vacuum pump utilized to evacuate (or pump down) a chamber communicating with the pump inlet 522, or a compression pump utilized pressurize and/or transport a fluid at a desired pressure and/or flow rate. For all such purposes, the pumping stage 518 generally may include one or more movable pump elements 530, which cooperate with one or more stationary components, i.e. pump stators (or housings) 536 to perform work on the working fluid. The movable pump element 530 is coupled to, and therefore moves with (or is moved by), the driven shaft 108. The movable pump element 530 moves relative to the pump stator (or housing) 536. Generally, the movable pump element 530 and the pump stator (or housing) 536 cooperatively define one or more fluid flow paths through which the working fluid is conducted (pumped) through the pumping stage 518, as appreciated by persons skilled in the art. The pump head 510 further generally includes a pump housing 548. As appreciated by persons skilled in the art, the pump stator 536 and the pump housing 548 are often combined or integrated (i.e., as a single structure or component) to perform both the functions of a stator and a housing instead of being two or more separate components.

The type or configuration of the movable pump element 530 (and corresponding pump stator 536) depends on the embodiment. Examples of movable pump elements 530 of the pumping stage 518 include, but are not limited to, an orbiting scroll, a rotary vane component, a crank, a cam, a gear, a screw, a Roots rotor (e.g., lobe), a claw, an impeller, a compressor wheel, a fan, and a piston, all of which are generally understood by persons skilled in the art.

The pump assembly 500 generally may have any type and number of bearings 540 on the drive side and bearings 544 on the driven side of the axial magnetic coupling assembly 100, as appreciated by persons skilled in the art. At least some of these bearings 540 and 544 are configured (e.g., designed and positioned) to bear the axial forces generated during operation of the pump assembly 500. As described herein, the axial magnetic coupling assembly 100 balances the additional axial forces it generates. Therefore, the use of the balanced axial magnetic coupling assembly 100 may allow for the same bearings 540 and 544 to be utilized in the pump assembly 500 (as would be utilized in a case where a more conventional mechanical coupling is provided between the motor 506 and the pump head 510). In other words, the pump assembly 500 may not require larger, special or non-standard designed, or additional bearings to accommodate the use of the axial magnetic coupling assembly 100.

The pump housing 548 may be configured in a manner appreciated by persons skilled in the art. The pump housing 548 may represent one or more components (e.g., cover, cowling, wall, etc.) that enclose the pumping stage 518, at least portions of the pump inlet 522 and pump outlet 526, pump-side bearings 544, and other internal components of the pump head 510. The pump housing 548 may include a frame that supports the pumping stage 518. As noted above, all or a portion of the pump stator 536 may be integral with, or attached to or supported by, the frame or other part of the pump housing 548. The pump housing 548 may further define one or more fluid passages of the pump inlet 522 and/or pump outlet 526. The pump housing 548 may also enclose and/or define a pump cooling system, such as a fan and associated air passages.

The contactless configuration of the axial magnetic coupling assembly 100 allows a structural boundary 552, such as a wall, plate, or the like, to be positioned in the axial gap 144 between the drive magnet assembly 112 and the driven magnet assembly 116. Preferably, to avoid eddy current losses (which may be significant), the structural boundary 552 is composed of an electrically insulating (non-electrically conductive) material. Examples of suitable electrically insulating materials for the structural boundary 552 include various organic polymers (plastics) and ceramics (e.g. glass). In an embodiment, the structural boundary 552 is composed of a liquid-crystal polymer (LCP) or an LCP-containing composite (for example, a combination of an LCP and a filler such as glass fiber). As appreciated by persons skilled in the art, LCPs are a class of aromatic polymers (e.g., aramids) processed to form a liquid crystalline phase. A structural boundary 552 constructed of an LCP is found to be advantageous for applications of the axial magnetic coupling assembly 100. The LCP material does not conduct electrical current and therefore avoids eddy current losses. The LCP material also exhibits high structural strength (high modulus) and therefore can withstand significant pressure differentials as may be encountered in a pumping application. Additionally, the LCP material exhibits a very low gas permeation rate compared to other polymers.

The role of the structural boundary 552 in conjunction with the axial magnetic coupling assembly 100 depends on the embodiment. In the embodiment illustrated in FIG. 5, the pump assembly 500 includes a casing 556 that encloses the driven side (e.g., driven magnet assembly 116) of the axial magnetic coupling assembly 100. The casing 556 may be integral with or attached to pump housing 548. The casing 556 may be, or be part of, a hermetic barrier of the pump head 510 configured to fluidly isolate all or part of the pump head 510 from the ambient (environment outside of the pump head 510). The structural boundary 552 described above may be, or be part of, the casing 556.

Figure 6A:
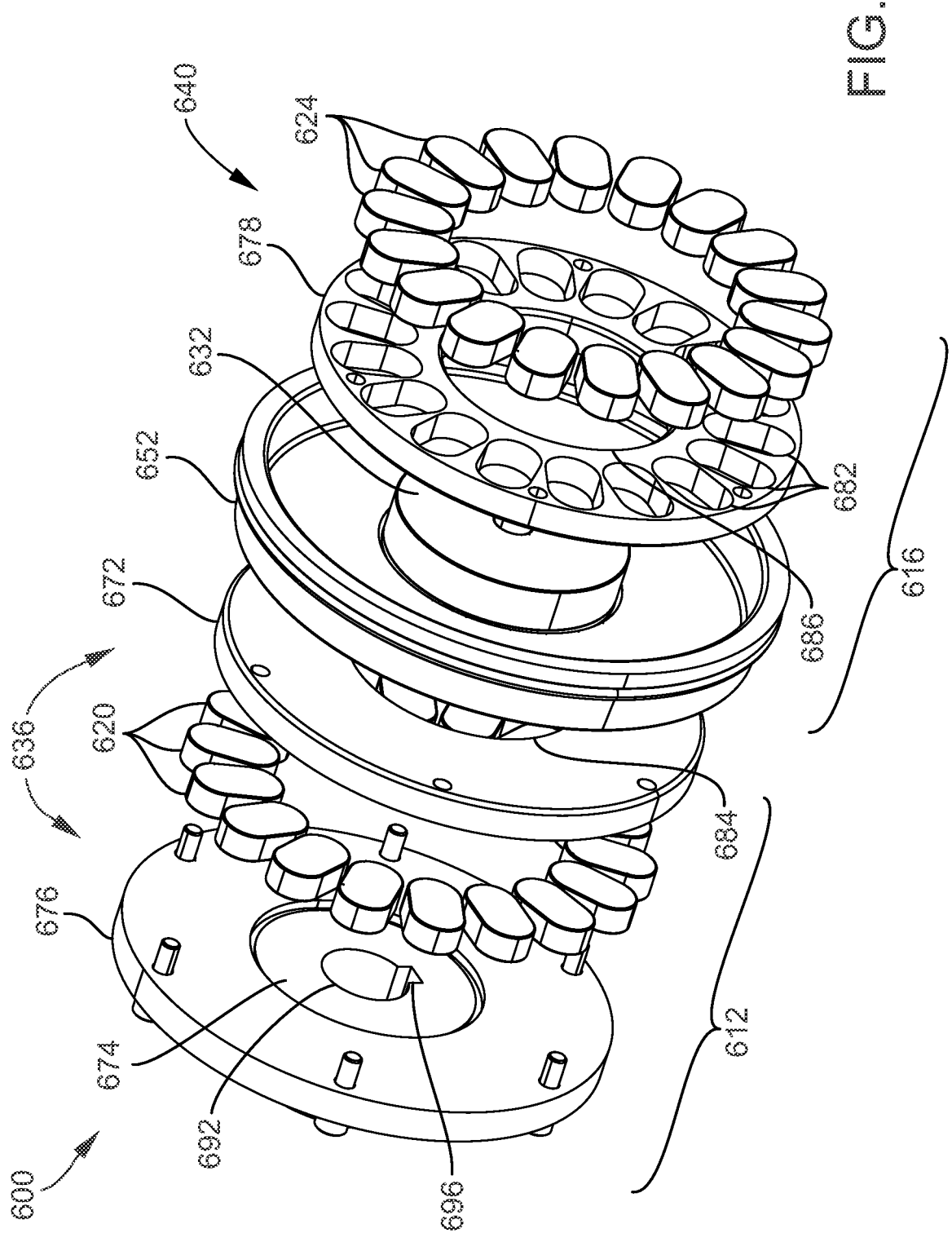
FIG. 6A is an exploded perspective view of an example of a (balanced) axial magnetic coupling assembly according to another embodiment of the present disclosure.
Figure 6B:
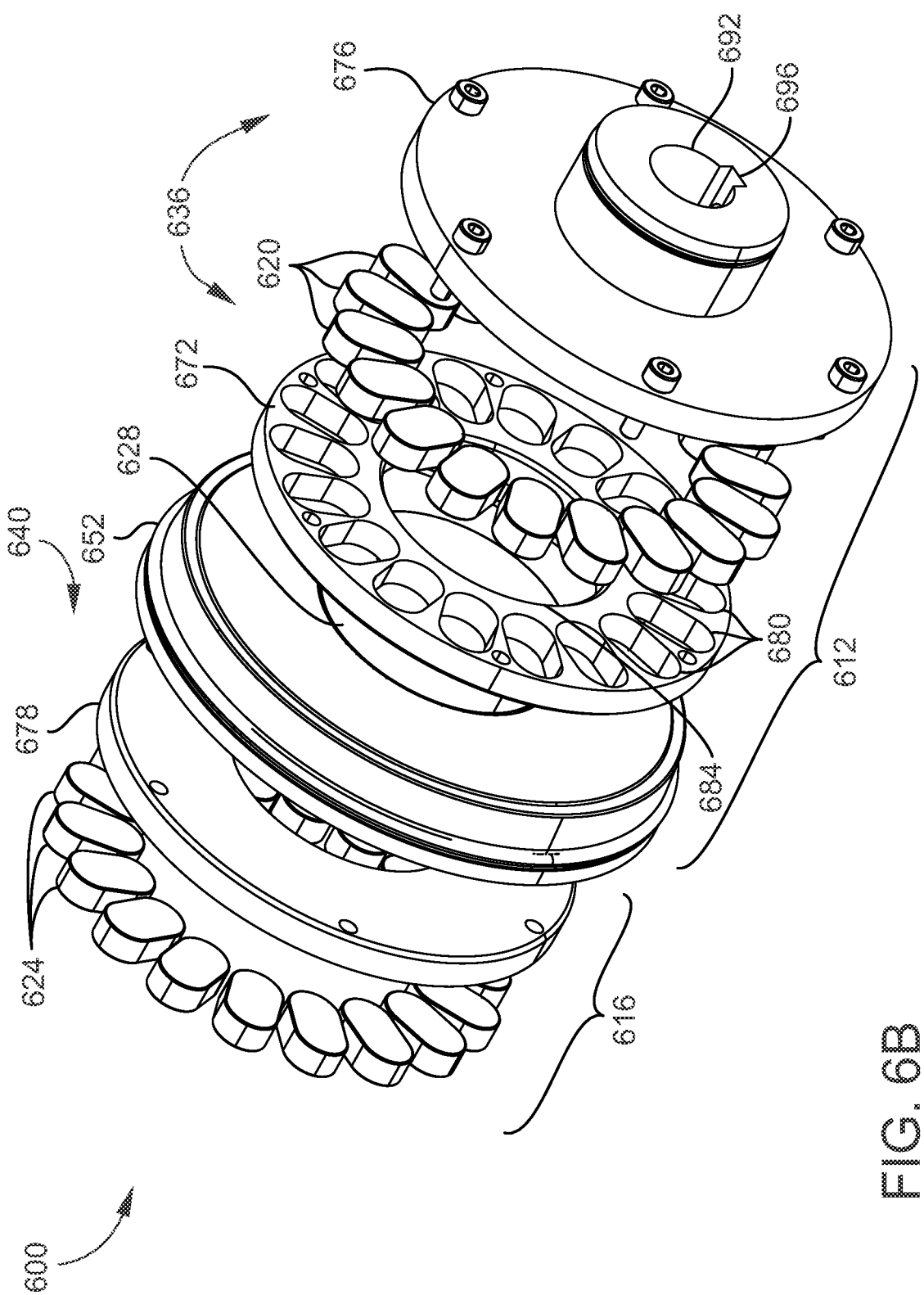
FIG. 6B is another exploded perspective view of the axial magnetic coupling assembly illustrated in FIG. 6A.
Figure 7A:
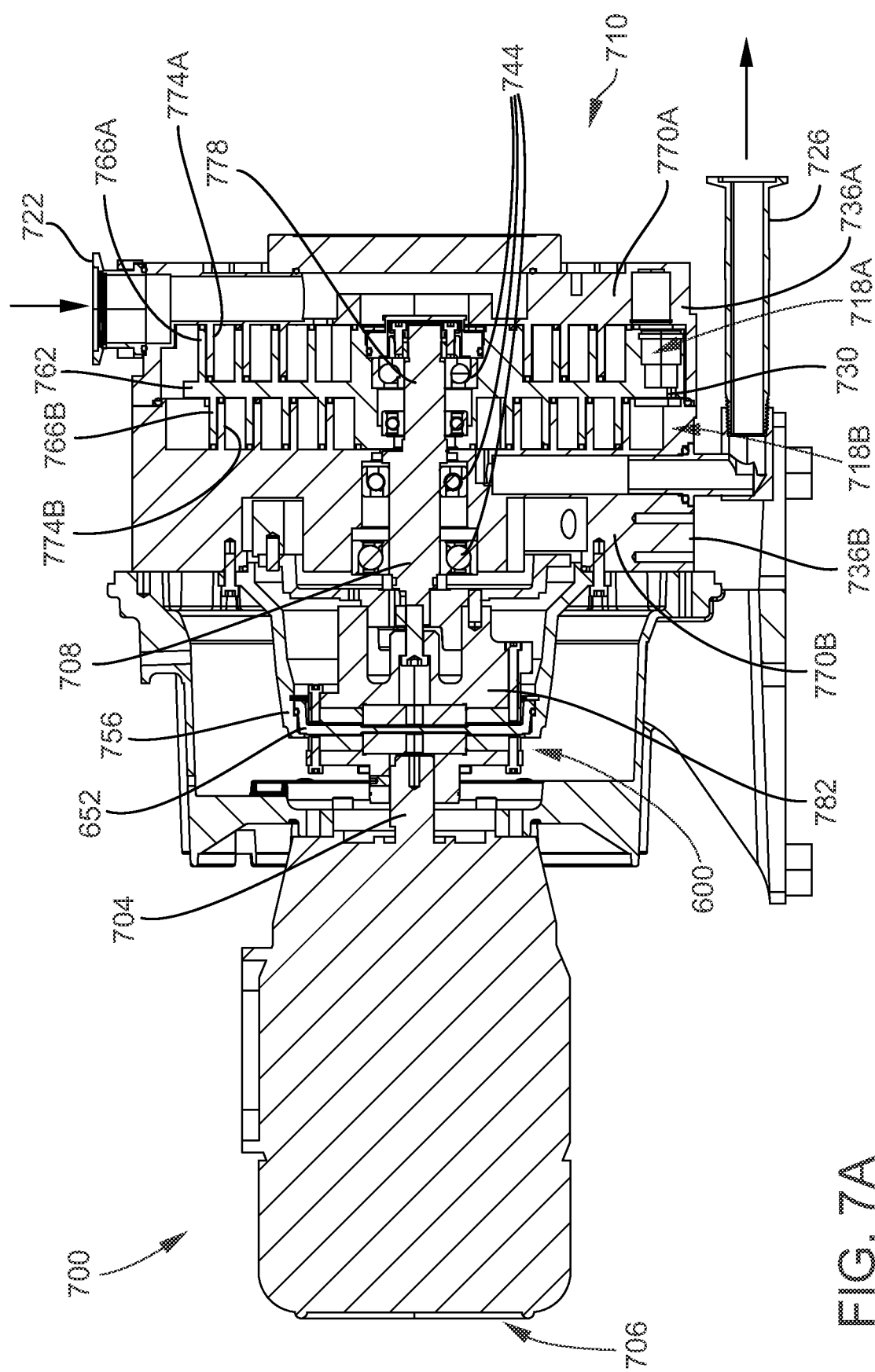
FIG. 7A is a schematic view of an example of a vacuum scroll pump (or pumping) assembly according to an embodiment of the present disclosure.
Figure 7B:
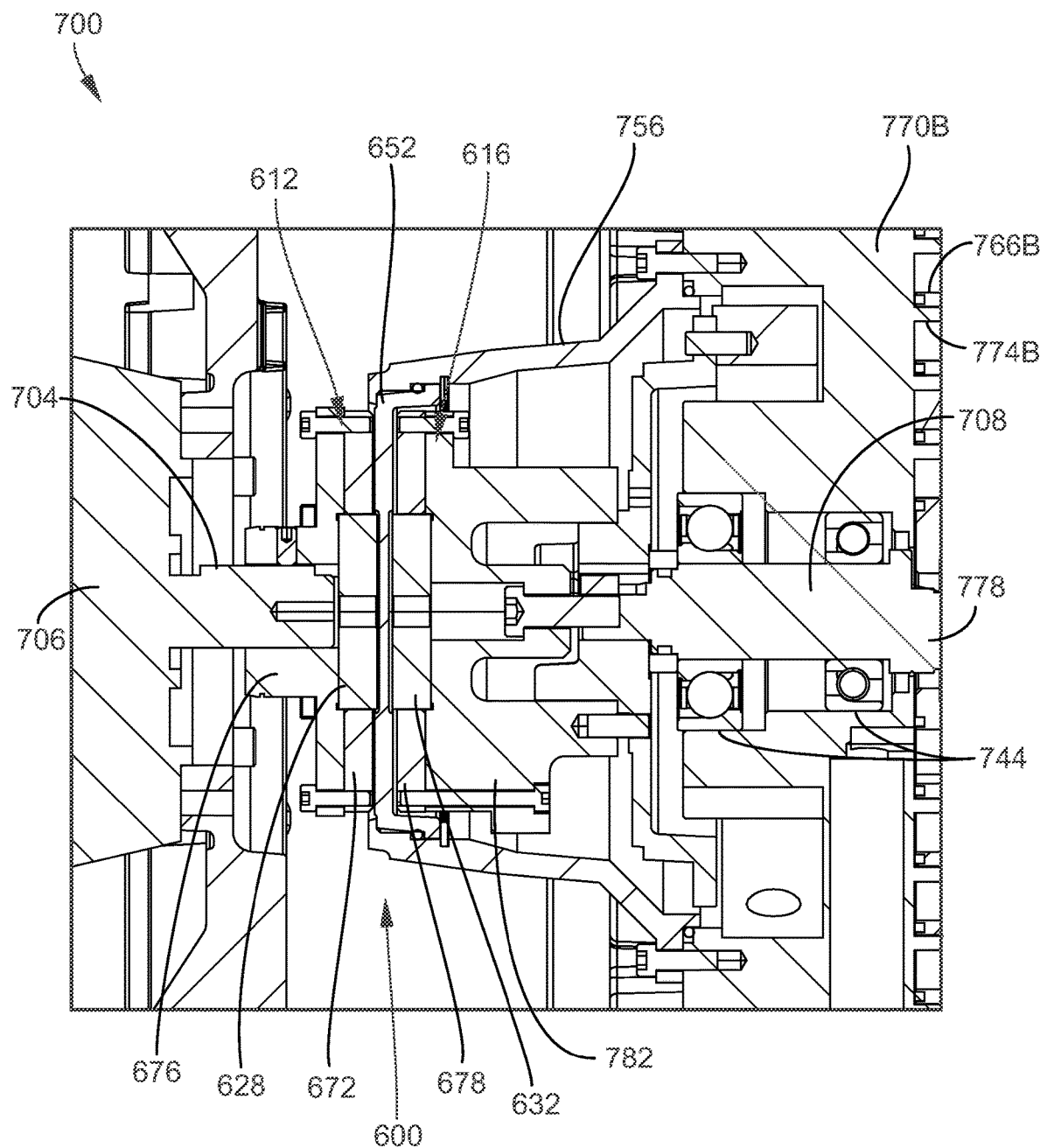
FIG. 7B is a close-up view of an axial magnetic coupling assembly and surrounding portions of the pump assembly illustrated in FIG. 7A.

FIG. 6A is an exploded perspective view of an example of a (balanced) axial magnetic coupling assembly 600 according to another embodiment of the present disclosure. FIG. 6B is another exploded perspective view of the axial magnetic coupling assembly 600. FIG. 6A is a view from the load side (e.g., pump side) and FIG. 6B is a view from the motor side of the axial magnetic coupling assembly 600. The axial magnetic coupling assembly 600 in assembled form is best shown in FIG. 7B.

The axial magnetic coupling assembly 600 generally includes a drive magnet assembly 612 configured to be coupled to a drive shaft (not shown), and a driven magnet assembly 616 configured to be coupled to a driven shaft (not shown). When assembled, the drive magnet assembly 612 and the driven magnet assembly 616 are separated by an axial gap as described herein. The axial magnetic coupling assembly 600 further includes a structural boundary 652 interposed in the axial gap between the drive magnet assembly 612 and the driven magnet assembly 616. The structural boundary 652 is composed of an electrically insulating material as described herein. In the present embodiment, the structural boundary 652 is provided in the form of a plate, disk, dish, or cap.

As in other embodiments, the drive magnet assembly 612 includes a first (drive-side) balancing magnet 628 (FIG. 6B) positioned on the drive axis and a plurality of peripheral drive magnets 620 coaxially surrounding the first balancing magnet 628. Similarly, the driven magnet assembly 616 includes a second (driven-side) balancing magnet 632 and a plurality of peripheral driven magnets 624 coaxially surrounding the second balancing magnet 632. The first balancing magnet 628 and second balancing magnet 632 face each other, and the drive magnets 620 and driven magnets 624 face each other, across the axial gap as described herein. The first balancing magnet 628, second balancing magnet 632, drive magnets 620, and driven magnets 624 may be configured according to any of the embodiments disclosed herein, such as any of those illustrated in FIGS. 1-5.

The drive magnet assembly 612 includes a drive magnet support structure 636. In the present embodiment, the drive magnet support structure 636 includes an annular drive (or first) magnet holder or retainer 672 and an annular drive-side (or first) hub 676. The drive magnet holder 672 is configured to hold (retain, fix, etc.) the drive magnets 620 in their arrayed position and support their rotation about the drive axis. For this purpose, in the present embodiment, the drive magnet holder 672 includes a plurality of drive magnet receptacles 680 in which the drive magnets 620 are respectively mounted. The drive magnet holder 672 also has a central bore 684 to accommodate the first balancing magnet 628. The drive-side hub 676 is configured to securely couple the drive magnet holder 672 with the drive magnets 620 to the drive shaft. For this purpose, the drive-side hub 676 has a central bore 692 through which the drive shaft passes. By way of illustrated example, the central bore 692 of the drive-side hub 676 includes a keyway 696 configured to engage a key on the drive shaft. The drive-side hub 676 may further include a central recess 674 for receiving the first balancing magnet 628.

Similarly, the driven magnet assembly 616 includes a driven magnet support structure 640. In the present embodiment, the driven magnet support structure 640 includes a driven (or second) magnet holder or retainer 678 and a driven-side (or second) hub 782 (FIGS. 7A and 7B). The driven magnet holder 678 is configured to hold (retain, fix, etc.) the driven magnets 624 in their arrayed position and support their rotation about the drive axis. For this purpose, in the present embodiment, the driven magnet holder 678 includes a plurality of driven magnet receptacles 682 in which the driven magnets 624 are respectively mounted. The driven magnet holder 678 also has a central bore 686 to accommodate the second balancing magnet 632. The driven-side hub 782 is configured to securely couple the driven magnet holder 678 with the driven magnets 624 to the driven shaft, as best shown in FIG. 7B. The driven-side hub 782 may further include a central recess (see FIGS. 7A and 7B) for receiving the second balancing magnet 632.

The respective sets of components of the drive magnet assembly 612 and the driven magnet assembly 616 may be secured together by any suitable means such as, for example bolts and corresponding threaded holes that clamp the components together in the axial direction(s). If desired, additional means may be taken to secure the various magnets in their respective receptacles or recesses, such as press-fitting, adhesive, etc. In a further embodiment and as illustrated, the structural boundary 652 may include central recesses at its drive side and driven side to at least partially accommodate the first balancing magnet 628 and the second balancing magnet 632, respectively.

FIG. 7A is a schematic view of an example of a vacuum scroll pump (or pumping) assembly 700 according to another embodiment, as another non-limiting example of a system-level or apparatus-level implementation of the subject matter disclosed herein. The pump assembly 700 includes a (balanced) axial magnetic coupling assembly according to any of the embodiments disclosed herein. In the illustrated example, the pump assembly 700 includes the axial magnetic coupling assembly 600 described above in conjunction with FIGS. 6A and 6B. FIG. 7B is a close-up view of the axial magnetic coupling assembly 600 and surrounding portions of the pump assembly 700. The structure and operation of vacuum scroll pumps are generally understood by persons skilled in the art, and thus the pump assembly 700 and certain components thereof are descried only briefly herein to provide a context for the presently disclosed subject matter.

The pump assembly 700 generally includes a motor 706 disposed on the drive side of the axial magnetic coupling assembly 600, and a pump head (assembly) 710 disposed on the driven side of the axial magnetic coupling assembly 600. As described above, the axial magnetic coupling assembly 600 intercouples the motor 706 and the pump head 710 in a contactless manner via a drive shaft 704 and a driven shaft 708, respectively.

The pump head 710 generally may include one or more pumping stages communicating with a pump inlet 722 and a pump outlet 726. In the present embodiment, the pump head 710 includes a first (or upstream) pumping stage 718A fluidly communicating in series (with respect to the fluid flow path) with a second (or downstream) pumping stage 718B. The first pumping stage 718A receives the (lower-pressure) working fluid from the pump inlet 722, compresses the fluid, and outputs the compressed fluid to the second pumping stage 718B. The second (or downstream) pumping stage 718B further compresses the fluid, and discharges the (now even higher-pressure) fluid to the pump outlet 726. In this example, the multi-stage compression mechanism of the pump head 710 is defined by a movable pump element 730 in the form of an orbiting plate scroll, a first pump stator 736A in the form of a first stationary plate scroll, and a second pump stator 736B in the form of a second stationary plate scroll. The movable pump element 730 (orbiting plate scroll) is interposed between, and orbits relative to, the first pump stator 736A (first stationary plate scroll) and the second pump stator 736B (second stationary plate scroll). The movable pump element 730 (on one axial side thereof) and the first pump stator 736A cooperatively define the first pumping stage 718A, and the movable pump element 730 (on the opposite axial side thereof) and the second pump stator 736B cooperatively define the second pumping stage 718B.

The movable pump element 730 includes an orbiting plate 762 that orbits in the transverse plane (the plane orthogonal to the drive axis of the axial magnetic coupling assembly 600, as described above). The movable pump element 730 further includes a first orbiting scroll blade 766A that extends (or projects) axially from the orbiting plate 762 toward the first pump stator 736A, and a second orbiting scroll blade 766B that extends (or projects) axially in the opposite direction from the orbiting plate 762 toward the second pump stator 736B. The first pump stator 736A includes a first stationary plate 770A, and a first stationary scroll blade 774A that extends (or projects) axially from the first stationary plate 770A toward the movable pump element 730. The second pump stator 736B includes a second stationary plate 770B, and a second stationary scroll blade 774B that extends (or projects) axially in the opposite direction from the second stationary plate 770B toward the movable pump element 730.

The first orbiting scroll blade 766A, second orbiting scroll blade 766B, first stationary scroll blade 774A, and second stationary scroll blade 774B are shaped as spirals (i.e., run along a spiral path) in the transverse plane, as appreciated by persons skilled in the art. The cross-sectional view of FIG. 7A shows the several turns or wraps of the spiral-shaped blades. As illustrated, the first orbiting scroll blade 766A is juxtaposed with the first stationary scroll blade 774A in the radial direction (relative to the longitudinal axis of the pump assembly 700), such that the first orbiting scroll blade 766A and the first stationary scroll blade 774A are nested together with a clearance and a predetermined relative angular positioning. By this configuration, one or more pockets are defined in the first pumping stage 718A by (and between) the nested first orbiting scroll blade 766A and first stationary scroll blade 774A. Likewise, the second orbiting scroll blade 766B is juxtaposed with the second stationary scroll blade 774B in the radial direction, such that the second orbiting scroll blade 766B and the second stationary scroll blade 774B are nested together with a clearance and a predetermined relative angular positioning. By this configuration, one or more pockets are defined in the second pumping stage 718B by (and between) the nested second orbiting scroll blade 766B and second stationary scroll blade 774B.

In the present embodiment, the driven shaft 708 is a crank shaft that is part of an eccentric drive mechanism. The main portion of the driven shaft 708 rotates on the drive axis as described above, and is attached to the driven-side (or second) hub 782 of the axial magnetic coupling assembly 600. At the end axially opposite to the axial magnetic coupling assembly 600, the driven shaft 708 includes (is integral with or coupled to) an eccentric member or crank 778. The crank 778 is coupled to the movable pump element 730. Various bearings 744 support the rotation of the driven shaft 708, the coupling of the crank 778 with the movable pump element 730, and the axial loads associated with the operation of the pump head 710. As in other embodiments, the use of the balanced axial magnetic coupling assembly 600 allows for the bearings 744 to be the same type of standard bearings that would be utilized in a case where a more conventional mechanical coupling is provided between the motor 706 and the pump head 710.

As illustrated, the central longitudinal axis of the crank 778 is radially offset from the central longitudinal axis of (the main portion of) the driven shaft 708 (which is coincident with the drive axis of the axial magnetic coupling assembly 600). Consequently, rotation of the driven shaft 708 causes the crank 778, and in turn the movable pump element 730, to orbit (rotate in an orbiting manner) around the drive axis. Accordingly, rotation of the driven shaft 708 causes the first orbiting scroll blade 766A to orbit relative to the first stationary scroll blade 774A, and the second orbiting scroll blade 766B to orbit relative to the second stationary scroll blade 774B. These motions cause the pockets between the nested pairs of blades to vary in volume and to move within the first pumping stage 718A and second pumping stage 718B in a manner whereby the pockets are selectively placed in open communication with the pump inlet 722 (or preceding pumping stage) and the pump outlet 726 (or succeeding pumping stage). As a result, the working fluid is conducted from the pump inlet 722, through the first pumping stage 718A, through the second pumping stage 718B, and to the pump outlet 726, and is compressed in each of the first pumping stage 718A and second pumping stage 718B.

The pump assembly 700 further includes a casing 756 that encloses the driven side of the axial magnetic coupling assembly 600. The casing 756 may be attached (in a fluid-sealed manner, if desired) to a stationary part of the pump head 710, such as a frame, the back of the second pump stator 736B, etc. The above-described structural boundary 652 positioned in the axial gap of the axial magnetic coupling assembly 600 may be an integral part of, or attached to, the casing 756. The casing 756 and structural boundary 652 may be, or be part of, a hermetic barrier of the pump head 710.

It will be understood that the multi-stage scroll pump configuration described above and illustrated in FIGS. 7A and 7B is but one example of a scroll pump in which the presently disclosed subject matter may be implemented. In another embodiment, the pump assembly 700 may include a single scroll pump stage, i.e., a single nested pair of an orbiting scroll blade and a stationary scroll blade. Scroll pumps are further described in, for example, U.S. Pat. No. 9,341,186 and U.S. Patent Application Pub. No. 2015/0078927, the entire contents of each of which are incorporated herein by reference.

The structural boundary 552 or 652 described above is useful in any configuration of the magnetic coupling. Accordingly, in addition to axial magnetic couplings, other embodiments of the present disclosure encompass any magnetic couplings incorporating the structural boundary 552 or 652, including radial magnetic couplings as described herein.

Figure 9:
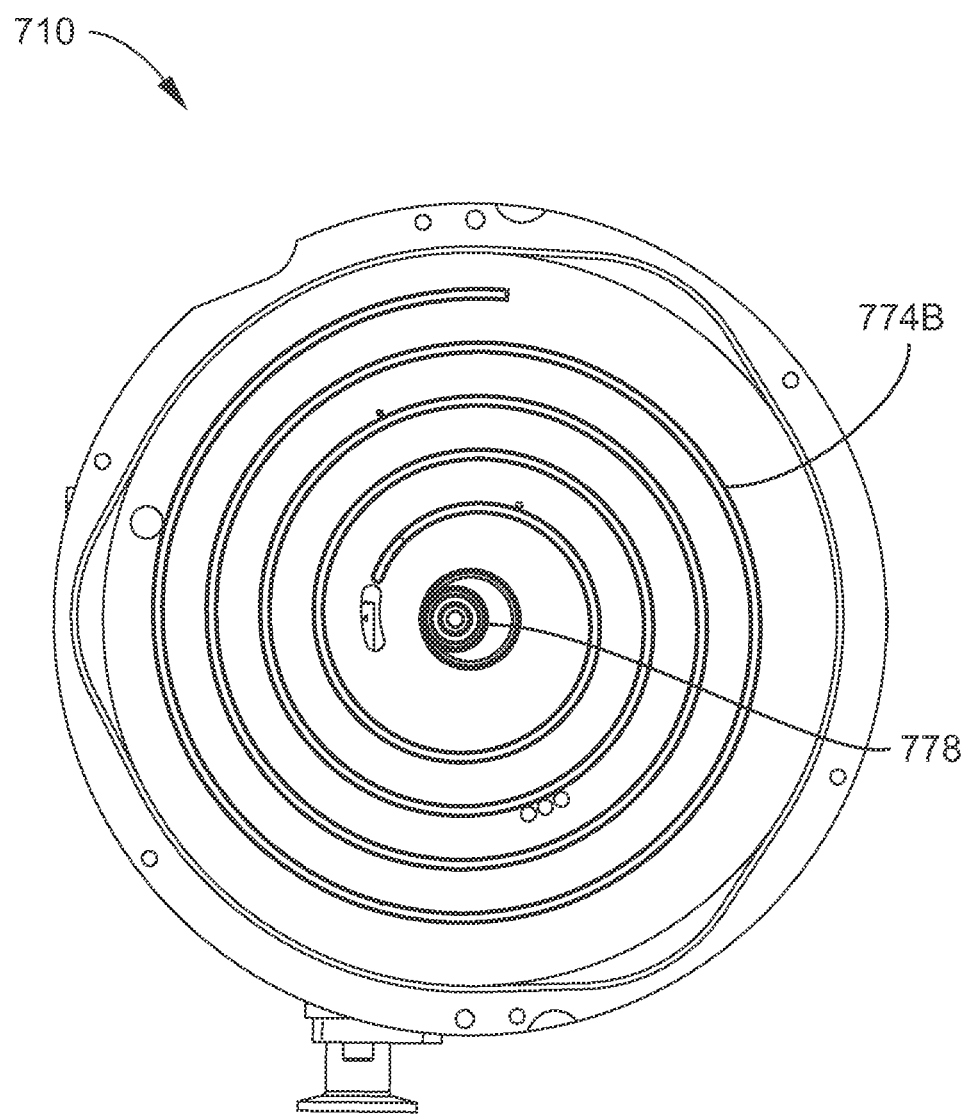
FIG. 9 is a plan view of an example of a portion of a pump head of a vacuum scroll pump (or pumping) assembly, illustrating a spiral-shaped scroll blade according to an embodiment of the present disclosure.

FIG. 9 is a plan view of a portion of the pump head 710, illustrating the spiral shape of the second stationary scroll blade 774B. The spiral shapes of the first stationary scroll blade 774A, first orbiting scroll blade 766A, and second orbiting scroll blade 766B may be similar. FIG. 9 also shows the eccentrically positioned crank 778.

Figure 10:
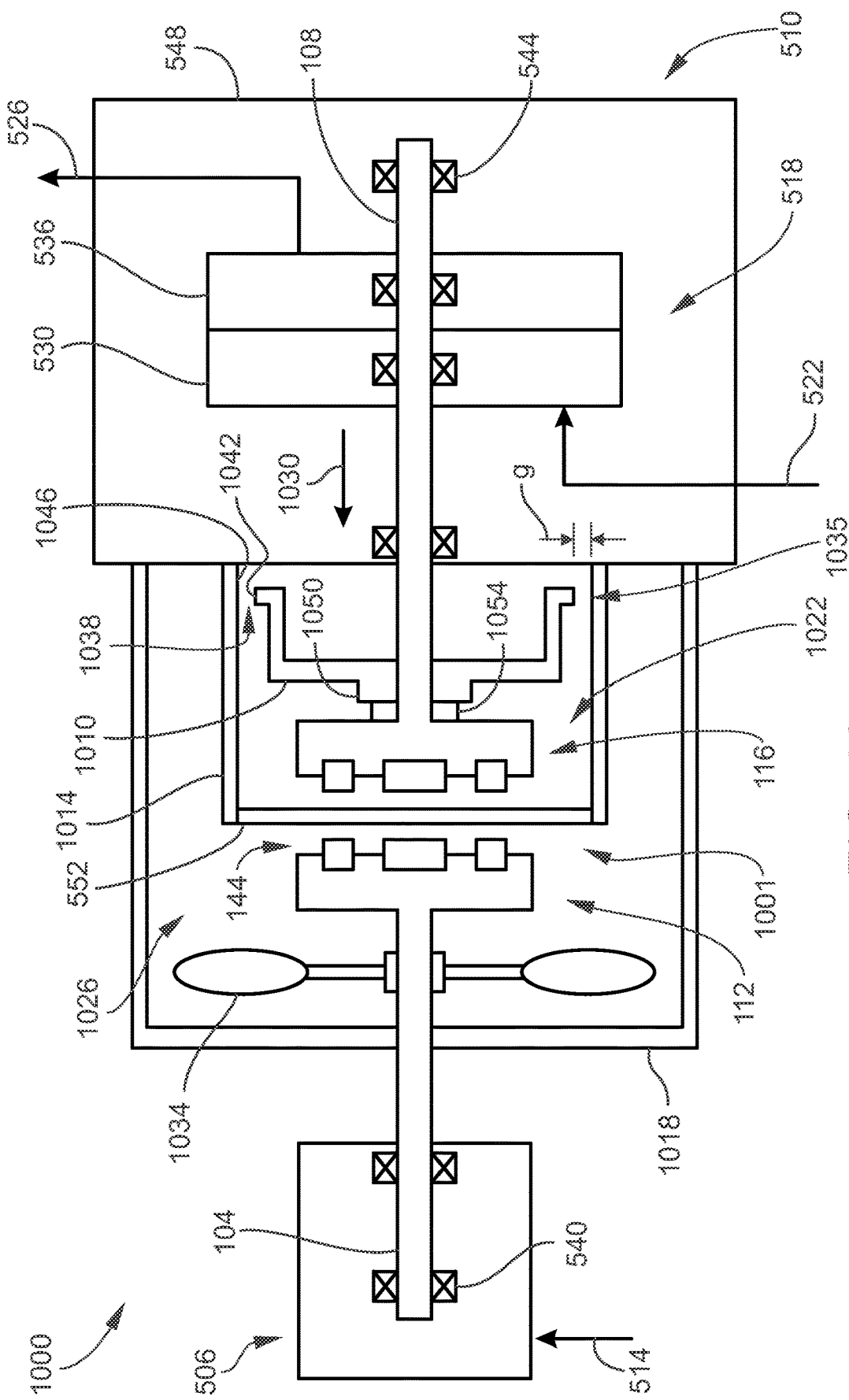
FIG. 10 is a schematic view of an example of a pump (or pumping) assembly according to another embodiment of the present disclosure.

FIG. 10 is a schematic view of an example of a pump (or pumping) assembly 1000 according to another embodiment. The pump assembly 1000 includes an axial magnetic coupling assembly 1001 configured for thermal isolation according to the present disclosure. The axial magnetic coupling assembly 1001 may otherwise be similar to, for example, the (balanced) axial magnetic coupling assembly 100 described above in conjunction with FIGS. 1-4 or the (balanced) axial magnetic coupling assembly 600 described above in conjunction with FIGS. 6A-7B. However, it is again noted that in addition to axial magnetic couplings, other embodiments of the present disclosure encompass other types of magnetic couplings such as radial magnetic couplings as described herein. The pump assembly 1000 may include other components that are the same as or similar to corresponding components described above in conjunction with FIG. 5. Such components are designated with the same reference numerals in FIG. 10.

In the present embodiment, the pump assembly 1000 includes a first (inside) housing 1010 coupled to the driven shaft 108 and rotatable therewith, and a stationary second (inside) housing 1014 disposed about the drive axis and surrounding (e.g., coaxially surrounding) the first housing 1010. The second housing 1014 may enclose the first housing 1010, or may partially enclose the first housing 1010 in cooperation with the pump head 510 (such as a part of the overall housing or frame 548 of the pump head 510). The second housing 1014 may further surround or enclose the driven magnet assembly 116 of the magnetic coupling assembly 1001 and a part of the driven shaft 108. The above-described structural boundary 552 disposed in the air gap 144 of the magnetic coupling assembly 1001 may be integral with or attached to the second housing 1014. The pump assembly 1000 includes a third (outer) housing 1018 surrounding or enclosing (e.g., coaxially surrounding) both the drive magnet assembly 112 and the driven magnet assembly 116 of the magnetic coupling assembly 1001, as well as the first housing 1010 and the second housing 1014.

Depending on the embodiment, one or more of the first housing 1010, the second housing 1014, and the third housing 1018 may be considered as being part of the magnetic coupling assembly 1001. Alternatively, one or more of the first housing 1010, the second housing 1014, and the third housing 1018 may be considered as being part of the pump head 510. For example, the second housing 1014 and/or the third housing 1018 may be integral with or attached to the overall housing or frame 548 of the pump head 510.

The first housing 1010 and the second housing 1014 cooperatively at least partially define a first chamber 1022 disposed about the drive axis. The driven side (i.e., the driven magnet assembly 116) of the magnetic coupling assembly 1001 is disposed in the first chamber 1022. At least a portion of the first chamber 1022 is disposed axially between the first housing 1010 and the driven magnet assembly 116. The first housing 1010 physically separates (i.e., serves as a physical boundary between) the first chamber 1022 (and thus the driven magnet assembly 116) from the pump head 510, particularly in the axial direction.

The second housing 1014 and the third housing 1018 cooperatively at least partially define a second chamber 1026 in which the drive magnet assembly 112 is disposed. The third housing 1018 physically separates (i.e., serves as a physical boundary between) the second chamber 1026 from the ambient, i.e., the space external to the pump assembly 1000.

During operation, the pump assembly 1000 generates a significant amount of heat energy due to the moving components and work of compression of the pump head 510 (e.g., from friction, shear, etc.). As the pump head 510 is axially adjacent to the magnetic coupling assembly 1001, a significant portion of this heat energy may be transferred to the magnetic coupling assembly 1001 through the modes of heat conduction, convection, and radiation, as schematically depicted by an arrow 1030 in FIG. 10. As noted in the Background section above, excessive heating of the magnetic coupling assembly 1001 undesirably impairs its operation.

In a typical embodiment, the pump assembly 1000 includes a cooling system configured to carry heat energy away from the pump head 510. For example, the pump assembly 1000 may include a fan 1034, one or more internal air passages (of which the second chamber 1026 may be a part), and one or more vents (not specifically shown) serving as inlets or outlets. The fan 1034 is positioned in an appropriate location for establishing one or more flow paths for drawing ambient air into the pump assembly 1000, routing the air to pick up and carry heat energy away from the pump head 510, and exhausting the heated air from the pump assembly 1000. In the illustrated example, the fan 1034 is disposed in the second chamber 1026 and is coupled to the drive shaft 104, but alternatively may be located elsewhere, such as in the pump head 510, in the housing of the motor 506, or at an axial end of the pump assembly 1000. In addition, cooling fins (not shown) may be provided on various internal and/or external surfaces of the pump assembly 1000. Such a cooling system, however, may not be sufficient for maintaining the magnetic coupling assembly 1001 at a reduced temperature required for its effective operation.

To address the problem of excessive heating of the magnetic coupling assembly 1001, the magnetic coupling assembly 1001 (or, more generally, the pump assembly 1000) includes a thermal isolation system configured to thermally isolate the magnetic coupling assembly 1001 (in particular the drive magnet assembly 112 and driven magnet assembly 116) from one or more heated regions of the pump head 510, i.e., one or more regions that typically are maintained at elevated temperatures during operation of the pump head 510. Such heated regions may be internal regions of the pump head 510 but are external (e.g., axially adjacent) to the magnetic coupling assembly 1001. Generally, the thermal isolation system is configured to limit heat convection and/or heat conduction from the pump head 510 to the magnetic coupling assembly 1001. For this purpose, the thermal isolation system may include one or more components, examples of which will now be described.

In an embodiment, the thermal isolation system includes a labyrinth seal 1035 positioned axially between the pump head 510 and the magnetic coupling assembly 1001. In the illustrated example, the labyrinth seal 1035 is defined between (or cooperatively by) the first housing 1010 and the second housing 1014. Specifically, the labyrinth seal 1035 includes a sealing gap 1038 formed between an annular first seal surface 1042 of the first housing 1010 and an annular second seal surface 1046 of the second housing 1014. While these features are annular or radial in the illustrated embodiment, alternatively, the sealing gap 1038 may be radial or some combination of axial and radial. The sealing gap 1038 is axially positioned between the heated region(s) of the pump head 510 on one side (i.e., a region external to the magnetic coupling assembly 1001, in particular external to the sealing gap 1038 and the first chamber 1022) and the first chamber 1022 and driven magnet assembly 116 on the other side. Accordingly, the first chamber 1022 is axially positioned between the sealing gap 1038 and the driven magnet assembly 116.

The sealing gap 1038 has a size characterized by a dimension, g. In the present example, the dimension, g, is a radial dimension, i.e. the distance between the first seal surface 1042 of the first housing 1010 and the second seal surface 1046 of the second housing 1014 that is along a radial axis orthogonal to the drive axis of the magnetic coupling assembly 1001. The size (dimension, g) is small enough to be effective to limit gas conductance or leakage flow from the external region (the pump head 510 in the present example), through the sealing gap 1038, and into the magnetic coupling assembly 1001 (i.e., the first chamber 1022). By this configuration, the labyrinth seal 1035 thermally isolates the first chamber 1022 (and hence the entire magnetic coupling assembly 1001) from heated region(s) external to the labyrinth seal 1035 (particularly the sealing gap 1038) and the first chamber 1022. In particular, the small sealing gap 1038 imposes a significant limitation on gas conductance through the sealing gap 1038 (from the pump head 510 toward the magnetic coupling assembly 1001), which thereby significantly reduces heat transfer to the magnetic coupling assembly 1001 by heat convection. Moreover, as the fluid passes through the small sealing gap 1038 at high velocity, its pressure energy is converted to mechanical energy. The labyrinth seal 1035 includes a series of one or more fluid flow contraction regions (narrow sealing gaps 1038 in the present example), each followed by a fluid flow expansion region (such as the entrance region of the first chamber 1022) where the mechanical energy is lost. By this configuration, the labyrinth seal 1035 prevents the mechanical energy from being converted back to pressure energy, thereby limiting the amount of leakage flow through the labyrinth seal 1035 and toward the magnetic coupling assembly 1001.

In one example, the size (dimension, g) of the sealing gap 1038 (the gap size) is in a range from 0.001 inch to 0.04 inch. In another example, the gap size is in a range from 0.004 inch to 0.01 inch. In another example, the gap size is in a range from 0.001 inch to 0.004 inch.

Depending on the embodiment, the driven magnet assembly 116 and the first housing 1010 may each be directly coupled to the driven shaft 108. In such case, the first housing 1010 may or may not be coupled to or otherwise in direct contact with the driven magnet assembly 116. Alternatively, the first housing 1010 may be coupled to the driven magnet assembly 116 (such as to a magnet retainer or hub thereof) and indirectly coupled to the driven shaft 108 via the driven magnet assembly 116. In all such cases, the first housing 1010, being heated by the external source of heat energy 1030, is in close thermal communication with the driven magnet assembly 116. In the present context, "close" thermal communication means that heat energy may be rapidly transferred from the first housing 1010 to the driven magnet assembly 116, due to direct contact (heat conduction) or close proximity (heat convection) between the first housing 1010 and the driven magnet assembly 116.

In an embodiment, the thermal isolation system includes one or more spacers axially positioned between the first housing 1010 and the driven magnet assembly 116. The spacers are configured to reduce heat transfer from the first housing 1010 to the driven magnet assembly 116, particularly heat transfer via heat conduction. Depending on the embodiment, the spacers are configured to reduce heat transfer by minimizing the surface area of direct contact between the first housing 1010 and the driven magnet assembly 116, and/or eliminating such direct contact by maintaining physical separation between the first housing 1010 and the driven magnet assembly 116, and/or spreading heat energy (such as radially away from the axial direction). In the illustrated example, the spacers of the thermal isolation system include one or more first spacers 1050 and/or one or more second spacers 1054.

The first spacer(s) 1050 may be axially positioned between the first housing 1010 and the driven magnet assembly 116, or between the first housing 1010 and the second spacer(s) 1054 if provided. The first spacer(s) 1050 may be integral with or attached to the outside surface of the first housing 1010 that faces the driven magnet assembly 116. In the present example, the first spacers 1050 are a set of ribs radially extending along the outside surface of the first housing 1010. The first spacers 1050 (e.g., as ribs) present a (significantly) smaller surface area available for heat transfer in comparison to the rest of the outside surface of the first housing 1010. By this configuration, the first spacers 1050 reduce the contact area between the first housing 1010 and the driven magnet assembly 116, or between the first housing 1010 and the second spacer(s) 1054 if provided, thereby reducing heat conduction from the first housing 1010 to the driven magnet assembly 116.

The second spacer(s) 1054 may be axially positioned between the first housing 1010 and the driven magnet assembly 116, or between the first spacer(s) 1050 (if provided) and the driven magnet assembly 116. The second spacer(s) 1054 typically surround the driven shaft 108, and thus may be annular (e.g., like a circular or polygonal washer). In the present example, the second spacer 1054 is realized by at least one shim separate from, but in contact with, the first housing 1010 (or the first spacer(s) 1050 if provided) and the driven magnet assembly 116. Alternatively, the second spacer(s) 1054 may be integral with or attached to the first housing 1010 or driven magnet assembly 116. Like the first spacer(s) 1050, the second spacer(s) 1054 present a (significantly) smaller surface area available for heat transfer in comparison to the rest of the outside surface of the first housing 1010, and also provides physical separation between the first housing 1010 and the driven magnet assembly 116, thereby minimizing conductive heat transfer from the first housing 1010 to the driven magnet assembly 116. Examples of the material composition of the second spacer(s) 1054 include, but are not limited to, stainless steel and other metal alloys, ceramics, polymers, composites, thermal insulators, and metals including low thermally conductive metals.

Accordingly, the thermal isolation system, through one or a combination of two or more thermal isolation components such as just described, is effective to thermally isolate the magnetic coupling assembly 1001 from an external heat energy source such as a pump head (e.g., pump head 510), by limiting convective (or also conductive) heat transfer to the magnetic coupling assembly 1001. Consequently, the thermal isolation system allows the magnetic coupling assembly 1001 to operate at a reduced temperature, the term "reduced" being relative to a configuration that lacks the thermal isolation system. The thermal isolation system accomplishes this by establishing a thermally isolated air pocket surrounding the magnetic coupling assembly 1001 (or at least the driven side of the magnetic coupling assembly 1001). In the present example, the air pocket corresponds to the interior of the second housing 1014. The thermal isolation system may operate in conjunction with a cooling system (e.g., fan 1034 and associated components, and cooling fins) to achieve the reduced temperature operation.

As one non-exclusive example, the pump assembly 1000 may operate in an environment in which the ambient temperature is 40° C. During operation, the temperature of the pump head 510 (i.e., the interior enclosed by the pump housing 548, in particular an internal region adjacent to the magnetic coupling assembly 1001, more particularly adjacent to the first housing 1010) may be in a range from 60° C. to 100° C. The magnetic coupling assembly 1001 (in particular, the interior of the second housing 1014, or "air pocket") operates at a temperature intermediate to the ambient temperature and the pump head temperature. This intermediate temperature is a reduced temperature due to the thermal isolation system, which may typically be assisted by a cooling system of the pump assembly 1000, and is reduced in comparison to the thermal isolation system being absent, as noted above. In the present example, the intermediate temperature may be in a range from 45° C. to 80° C.

Figure 11A:
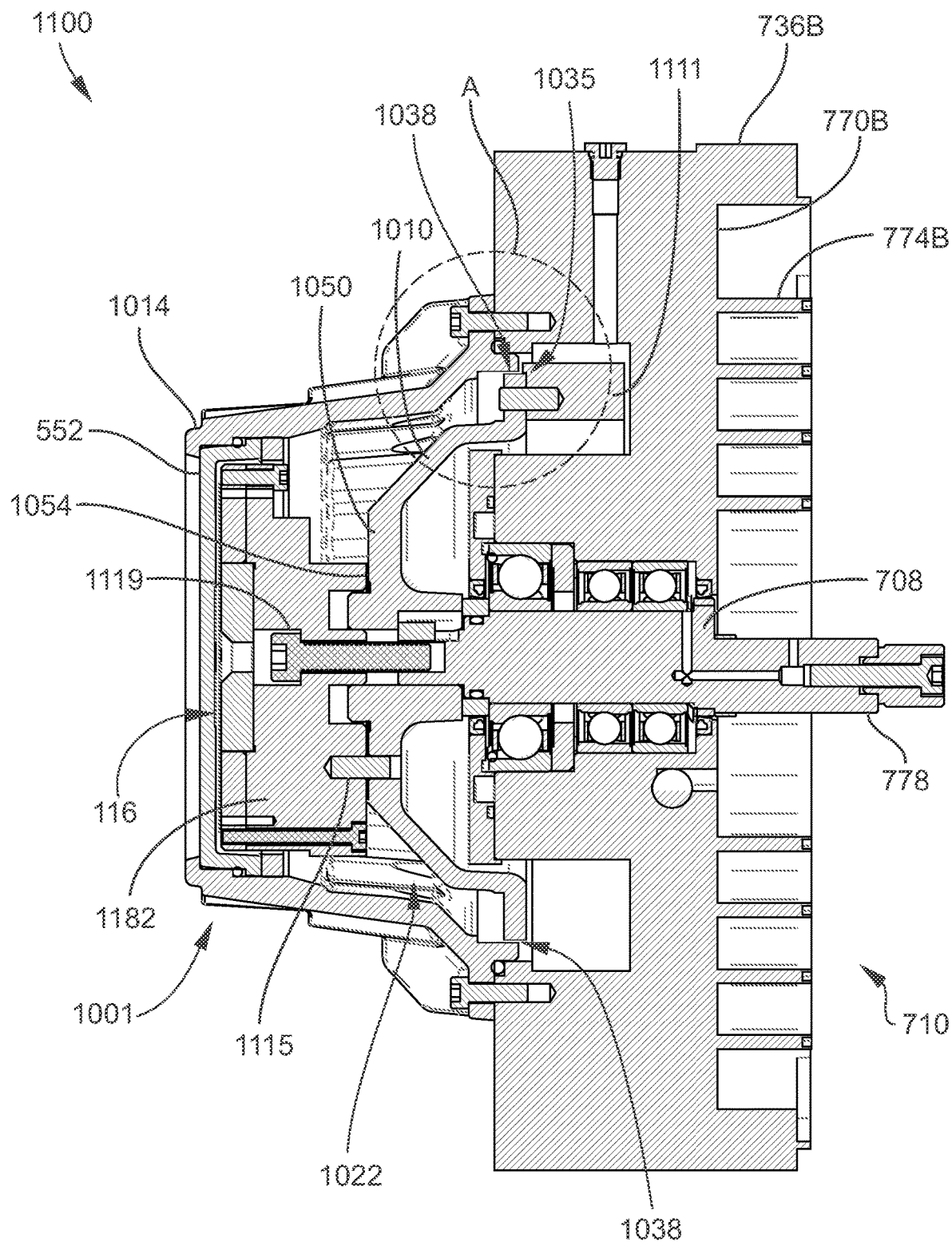
FIG. 11A is a cross-sectional side view of an example of a portion of a vacuum scroll pump (or pumping) assembly according to another embodiment.
Figure 11B:
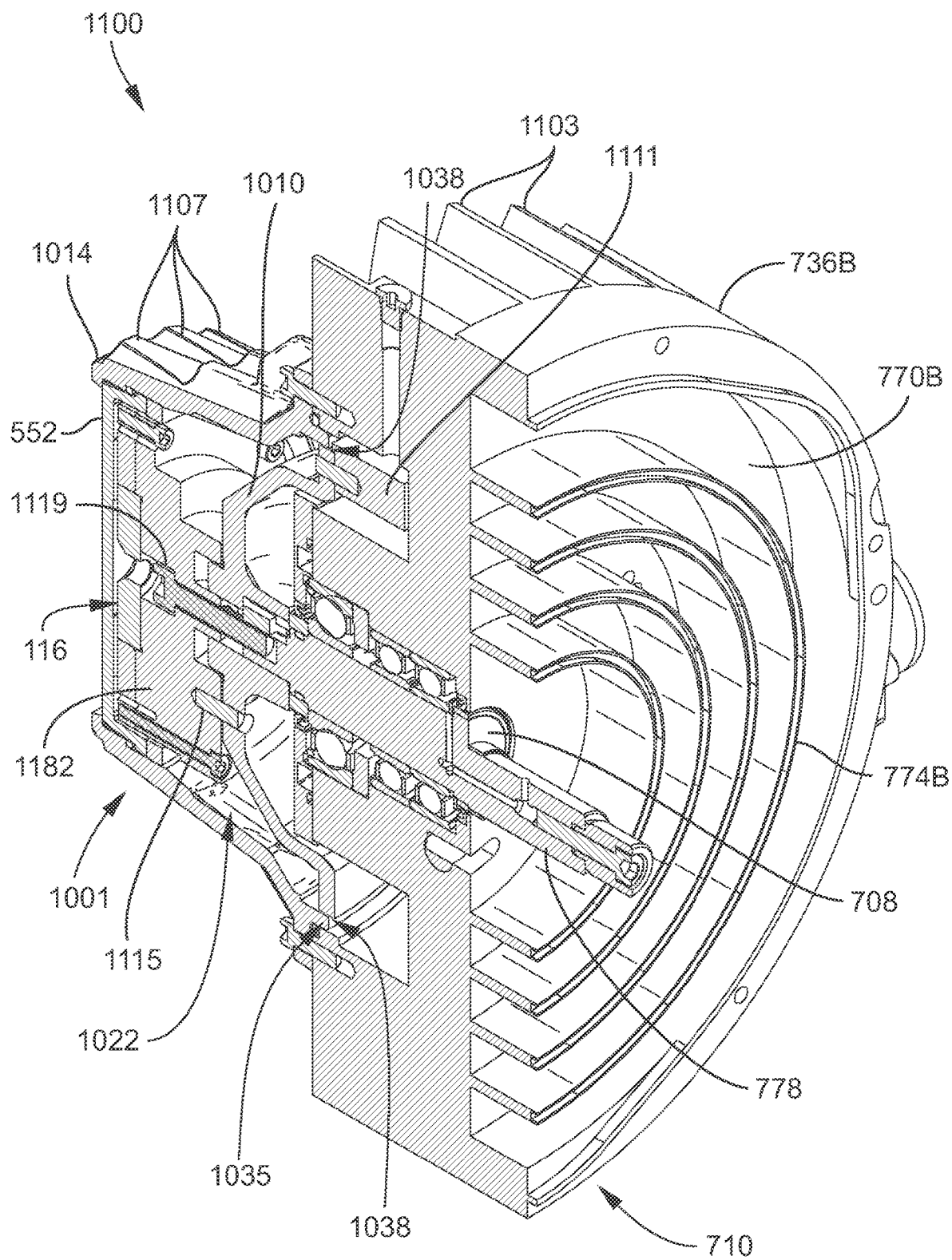
FIG. 11B is a cross-sectional perspective view of the same portion illustrated in FIG. 11A.

FIG. 11A is a cross-sectional side view of an example of a portion of a vacuum scroll pump (or pumping) assembly 1100 according to another embodiment, as another non-limiting example of a system-level or apparatus-level implementation of the subject matter disclosed herein. FIG. 11B is a cross-sectional perspective view of the same portion illustrated in FIG. 11A. The pump assembly 1100 includes a magnetic coupling assembly with thermal isolation according to any of the embodiments disclosed herein, such as the thermally isolated magnetic coupling assembly 1001 described above in conjunction with FIG. 10. Thus, the pump assembly 1100 includes a rotating first (inside) housing 1010, a stationary second (inside) housing 1014, a structural boundary 552, a third (outer) housing (not shown), a first chamber 1022, and a second chamber (not shown), all as described above. The pump assembly 1100 may include other components that are the same as or similar to corresponding components described above in conjunction with FIGS. 7A and 7B. Such components are designated with the same reference numerals in FIGS. 7A and 7B and FIG. 10. The portion of the pump assembly 1100 illustrated in FIGS. 11A and 11B includes the driven side of the magnetic coupling assembly 1001 and a portion of the pump head 710 that is attached to the magnetic coupling assembly 1001.

The pump assembly 1100 (or the magnetic coupling assembly 1001) may include a cooling system. The cooling system may include a fan (not shown) and associated components as described above. The cooling system may also include cooling fins. In the present embodiment, as best shown in FIG. 11B, a set of cooling fins 1103 extend radially outward from an outside surface of the pump head 710 and are circumferentially spaced from each other about the drive axis. Another set of cooling fins 1107 extend radially outward from an outside surface of the second housing 1014 of the magnetic coupling assembly 1001 and are circumferentially spaced from each other about the drive axis.

The pump assembly 1100 (or the magnetic coupling assembly 1001) further includes a thermal isolation system. One component of the thermal isolation system is a labyrinth seal 1035 that includes a minimized scaling gap 1038 formed between the first housing 1010 and the second housing 1014 and thermally isolating the first chamber 1022, as described above. Other components of the thermal isolation system may include one or more first spacers 1050 and/or one or more second spacers 1054. In the present embodiment, the first spacers 1050 are in the form of radially extending ribs disposed on the outside surface of the first housing 1010 facing the driven magnet assembly 116. The second spacer(s) 1054 are in the form of at least one shim interposed between (and in contact with) the first spacers 1050 and the driven magnet assembly 116 (specifically, a driven-side hub 1182 of the driven magnet assembly 116).

The structure and operation of the foregoing components of the pump assembly 1100 and magnetic coupling assembly 1001 may be the same as or similar to those described earlier in conjunction with FIG. 10.

Figure 12A:
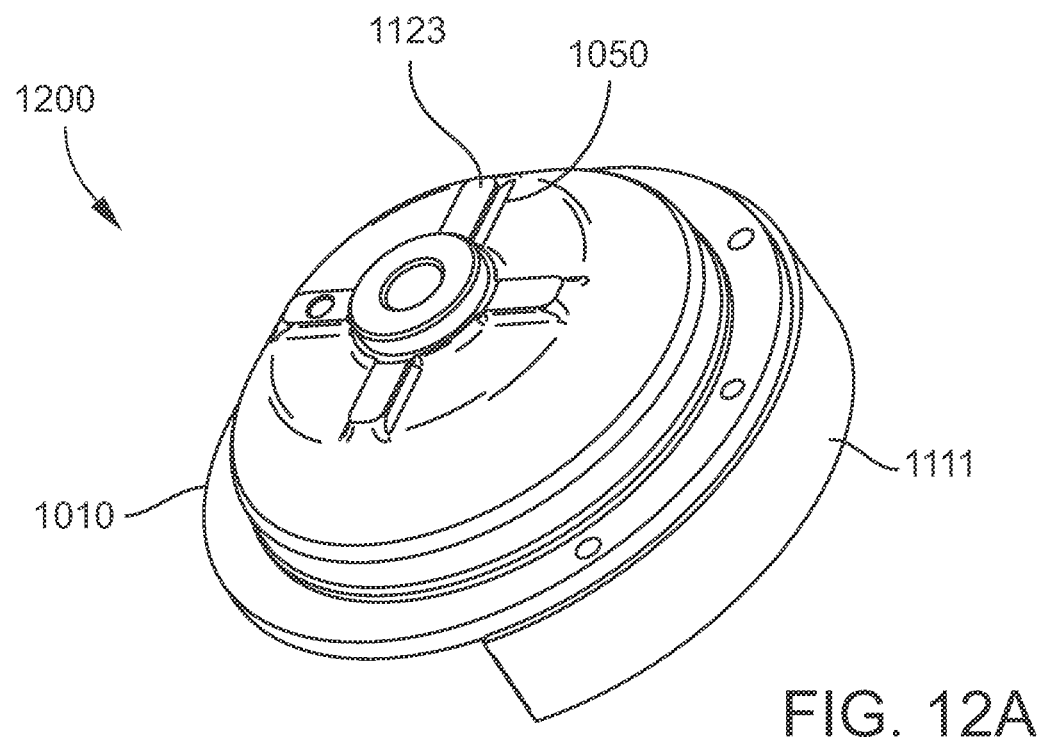
FIG. 12A is a perspective view of an example of a counterweight assembly according to an embodiment of the present disclosure.
Figure 12B:
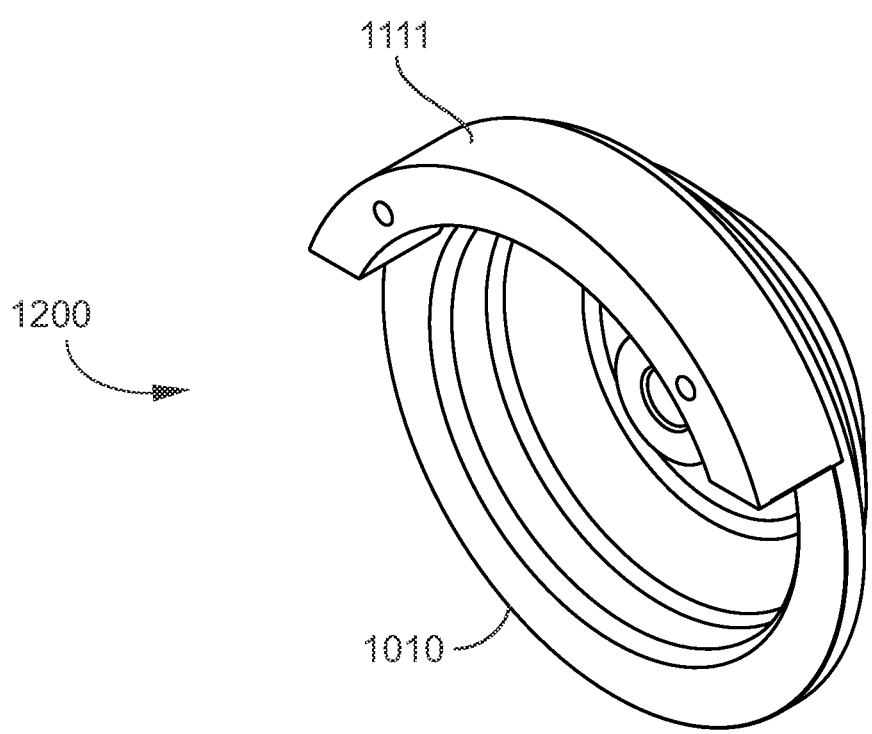
FIG. 12B is another perspective view of the counterweight assembly illustrated in FIG. 12A.

In the embodiment illustrated in FIGS. 11A and 12A, the first housing 1010 of the magnetic coupling assembly 1001 is part of a counterweight assembly 1200 (see FIGS. 12A and 12B). Specifically, the first housing 1010 serves as a counterweight support that supports a counterweight 1111 of the counterweight assembly 1200. The counterweight 1111 is attached to and rotates with the first housing 1010 about the drive axis to balance certain forces generated by moving (e.g., orbiting) components of the pump head 710.

Also in the present embodiment, the driven-side hub 1182 may function as a counterweight that cooperates with the counterweight 1111 supported by the first housing 1010 to achieve a two-plane or dynamic balance by reacting both radial force imbalance and moment imbalance (by making sure that the sum of the forces and also the sum of the moments are zero). To angularly align these two counterweights, the first housing 1010 may be coupled to the driven-side hub 1182 of the driven magnet assembly 116 by a single pin 1115. Also, the driven-side hub 1182 is coupled to the driven shaft 708 by a bolt 1119 that passes through a central bore of the first housing 1010 along the drive axis. The first housing 1010 is mounted on the driven shaft 708 and is securely retained by the fastening force provided by the bolt 1119. This, however, is but one non-exclusive example. The driven-side hub 1182, first housing 1010, and driven shaft 708 may be mechanically referenced to each other by any suitable configuration, as appreciated by persons skilled in the art. In all such cases, the second spacer 1054 maintains physical separation between the driven-side hub 1182 and the first housing 1010 and is effective to minimize conductive heat transfer in the manner described herein.

Figure 11C:
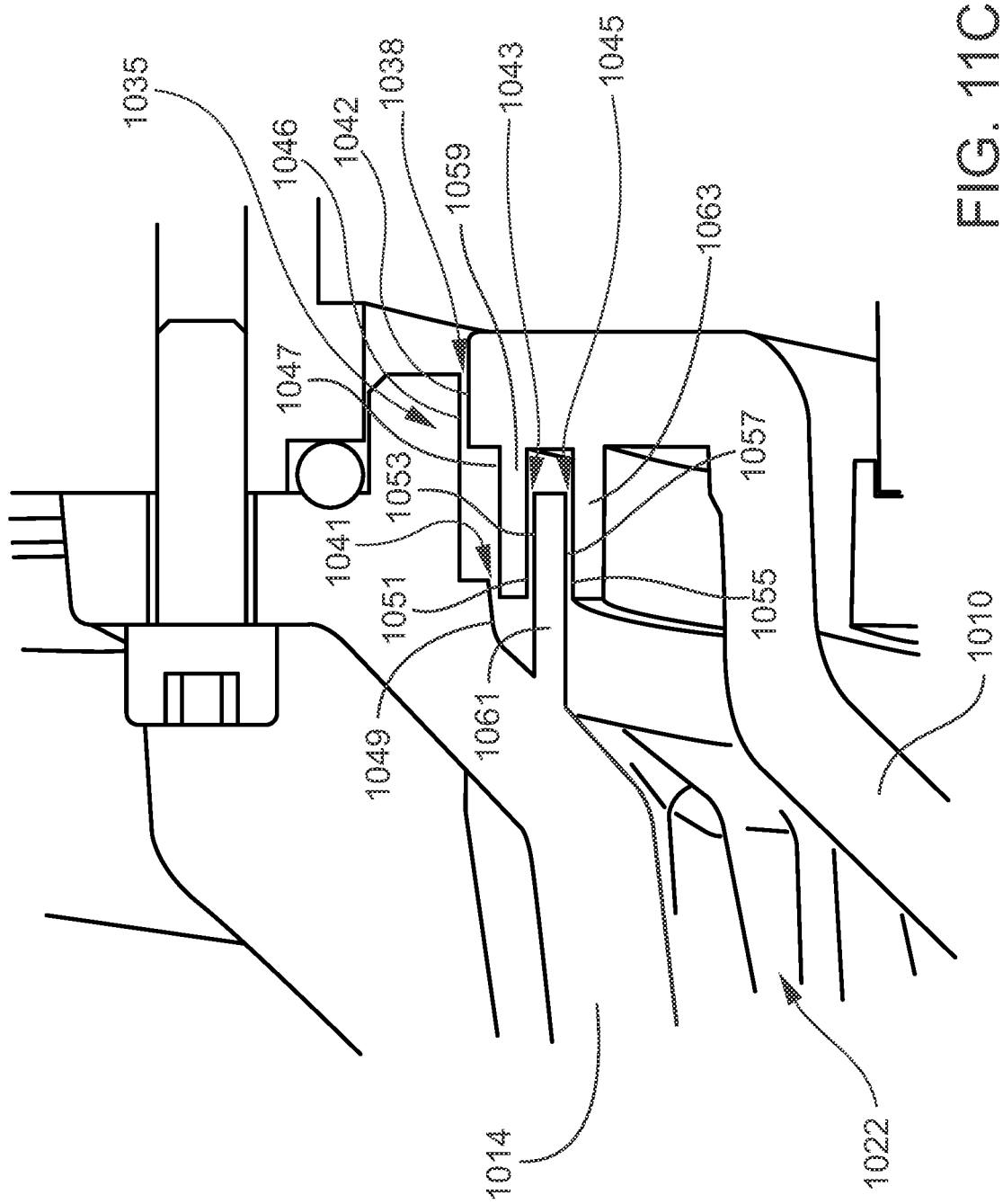
FIG. 11C is a magnified view of the region labeled "A" in FIG. 11A, illustrating a cross-sectional portion of a labyrinth seal according to embodiments of the present disclosure.

FIG. 11C is a magnified view of the region labeled "A" in FIG. 11A, illustrating a cross-sectional portion of the labyrinth seal 1035. The labyrinth seal 1035 is configured to provide a fluid path from outside of the labyrinth seal 1035 (e.g., the heated region(s) of the pump head 710), through the labyrinth seal 1035, and into the first chamber 1022. In an embodiment, the fluid path includes one or more fluid contraction regions and one or more fluid expansion regions (or chambers), with each fluid contraction region followed by a fluid expansion region as described above.

In the illustrated example, the labyrinth seal 1035 includes a plurality of sealing gaps that define respective fluid contraction regions in the fluid path. The (first) sealing gap 1038 is formed between the first seal surface 1042 of the first housing 1010 and the second seal surface 1046 of the second housing 1014 as described above. In addition, the labyrinth seal 1035 includes a second sealing gap 1041, a third sealing gap 1043, and a fourth sealing gap 1045, although the labyrinth seal 1035 may include less or more sealing gaps. The size (dimension, g, which is a radial dimension in the present example) of each sealing gap 1038, 1041, 1043, and 1045 may be in one of the ranges given above by example. The scaling gaps 1038, 1041, 1043, and 1045 may be located at different radial positions relative to the drive axis of the magnetic coupling assembly 1001. One or more of the sealing gaps 1038, 1041, 1043, and 1045 may overlap at least partially with one or more of the other scaling gaps 1038, 1041, 1043, and 1045. In the illustrated example, the second sealing gap 1041 is formed between a third seal surface 1047 of the first housing 1010 and a fourth seal surface 1049 of the second housing 1014. The third sealing gap 1043 is formed between a fifth seal surface 1051 of the first housing 1010 and a sixth seal surface 1053 of the second housing 1014. The fourth sealing gap 1045 is formed between a seventh seal surface 1055 of the first housing 1010 and an eighth seal surface 1057 of the second housing 1014.

FIG. 11C also shows that each sealing gap 1038, 1041, 1043, and 1045 is immediately followed by a larger fluid expansion region. Thus, there is a fluid expansion region between the sealing gaps 1038 and 1041, between the sealing gaps 1041 and 1043, between the sealing gaps 1043 and 1045, and after the sealing gap 1045 (i.e., where the fluid enters the first chamber 1022).

The labyrinth seal 1035 may include a plurality of annular seal walls (or teeth) configured (sized, shaped, positioned, etc.) such that a sealing gap is defined between each pair of adjacent seal walls. In the illustrated example, the labyrinth seal 1035 includes a first seal wall 1059, a second seal wall 1061, and a third seal wall 1063. The first seal wall 1059 and the third seal wall 1063 extend axially (parallel to the drive axis) from the first housing 1010 toward the first chamber 1022 and magnetic coupling assembly 1001, and the second seal wall 1061 extends axially from the second housing 1014 away from the magnetic coupling assembly 1001. The seal walls 1059, 1061, and 1063 are nested, or interdigitated, with each other. Thus, in the present example of three seal walls, the second seal wall 1061 extends into the space between the first seal wall 1059 and the third seal wall 1063. By this configuration, the second sealing gap 1041 is formed between the second housing 1014 and the first seal wall 1059, the third sealing gap 1043 is formed between the first seal wall 1059 and the second seal wall 1061, and the fourth sealing gap 1045 is formed between the second seal wall 1061 and the third seal wall 1063.

Also in the illustrated example, the third seal surface 1047 is an outer surface of the first seal wall 1059, the fourth seal surface 1049 is a surface of the second housing 1014, the fifth seal surface 1051 is another outer surface of the first seal wall 1059, the sixth seal surface 1053 is an outer surface of the second seal wall 1061, the seventh seal surface 1055 is an outer surface of the third seal wall 1063, and the eighth seal surface 1057 is another outer surface of the second seal wall 1061.

Accordingly, in this example, the sealing gaps 1038, 1041, 1043, and 1045 are in fluid communication with each other via the fluid expansion regions, all of which are part of the fluid path of the labyrinth seal 1035. From the pump side of the labyrinth seal 1035, the fluid path runs through the first sealing gap 1038 in an overall or net axial direction toward the first chamber 1022 and magnetic coupling assembly 1001, then through a fluid expansion region, and then through the second sealing gap 1041. The fluid path then reverses direction in another fluid expansion region and runs through the third sealing gap 1043 in an overall or net axial direction away from the first chamber 1022 and magnetic coupling assembly 1001, then again reverses direction in yet another fluid expansion region and runs through the fourth sealing gap 1045 in an overall or net axial direction back toward the first chamber 1022 and magnetic coupling assembly 1001, and then into the first chamber 1022. The fluid flow again undergoes expansion upon entering the first chamber 1022.

From the foregoing, it is evident that the labyrinth seal 1035 may deliberately cause loss of pressure energy in the fluid flow, by converting pressure energy into mechanical energy and preventing conversion of the mechanical energy back to pressure energy. The labyrinth seal 1035 also may significantly limit gas conductance into the magnetic coupling assembly 1001 from an external source of heat energy such as the pump head 710 of this example. In addition to providing a labyrinthine fluid path, the labyrinth seal 1035 may be configured to create one or more fluid vortices along the fluid path, such as in the fluid expansion regions between the entrances and exits of the sealing gaps 1038, 1041, 1043, and 1045. These regions may serve to delay the continued flow of gas molecules through the labyrinth seal 1035 by at least temporarily trapping the gas molecules in a vortex. The gas vortices may also serve as at least temporarily barriers to the passage of other gas molecules that are entering the labyrinth seal 1035.

In a further embodiment illustrated in FIG. 11C, the fluid path takes one or more turns such that the fluid path changes direction one or more times through the labyrinth seal 1035, such as in one or more of the fluid expansion regions as described above. In one example, the fluid path takes one or more turns such that the fluid path reverses direction (i.e., takes one or more 180 degree turns) one or more times through the labyrinth seal 1035. In the illustrated example, the fluid path of the labyrinth seal 1035 reverses direction two times, but alternatively may reverse direction one time or more than two times. In all such cases, the fluid path provided by the labyrinth seal 1035 may increase the effectiveness of the labyrinth seal 1035 in limiting gas conductance, and thus heat convection, therethrough.

In an embodiment, the driven-side hub 1182 has an asymmetric shape. In this case, there will be lower pressure locations where fluid will be entering through the labyrinth seal 1035 into the first chamber 1022, while in other, higher pressure locations fluid will be exiting the first chamber 1022 through the labyrinth seal 1035. The net result will be no increase or decrease of the fluid mass in the first chamber 1022, but rather a transfer of thermal energy into the first chamber 1022, which is minimized by the labyrinth seal 1035 because the labyrinth seal 1035 restricts the mass flow of the fluid into and out of the first chamber 1022.

Figure 11D:
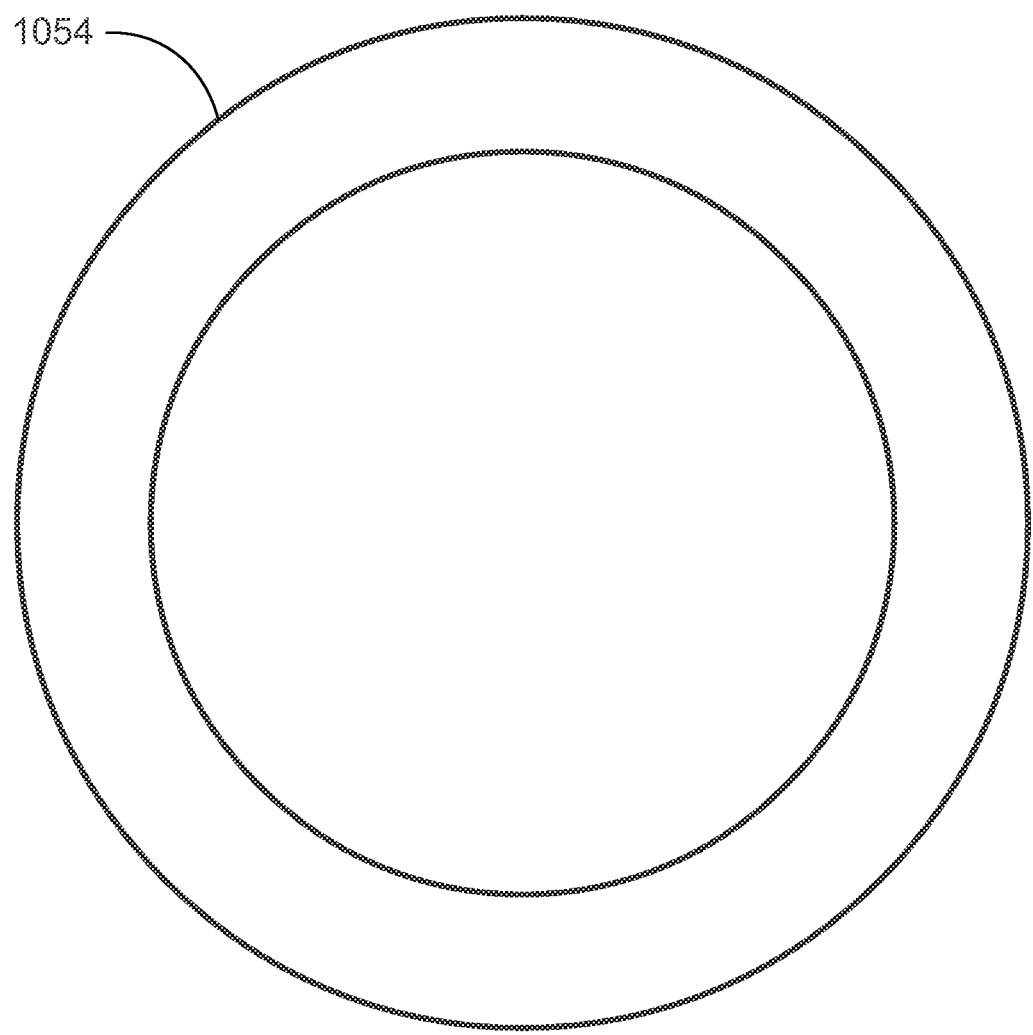
FIG. 11D is a plan view of an example of a thermal isolation shim according to an embodiment of the present disclosure.

FIG. 11D is a plan view of an example of a thermal isolation shim that may be utilized as the second spacer 1054 described above. The shim is ring-shaped to accommodate a component or components located on the drive axis. The shim may be composed of a suitable thermally conductive material such as noted above.

FIGS. 12A and 12B are two different perspective views of an example of the counterweight assembly 1200. FIG. 12A shows one non-exclusive example of the first spacers 1050 of the thermal isolation system. In this example, the first spacers 1050 are shaped as radially-oriented ribs having flat faces 1123 configured to abut a corresponding surface or surfaces of the driven-side hub 1182 of the driven magnet assembly 116. Also in this example, there are four first spacers 1050 arranged in a cross pattern. In other examples, however, less or more first spacers 1050 may be provided, and the first spacers 1050 may have different shapes and/or spatial arrangements/orientations.

Figure 13A:
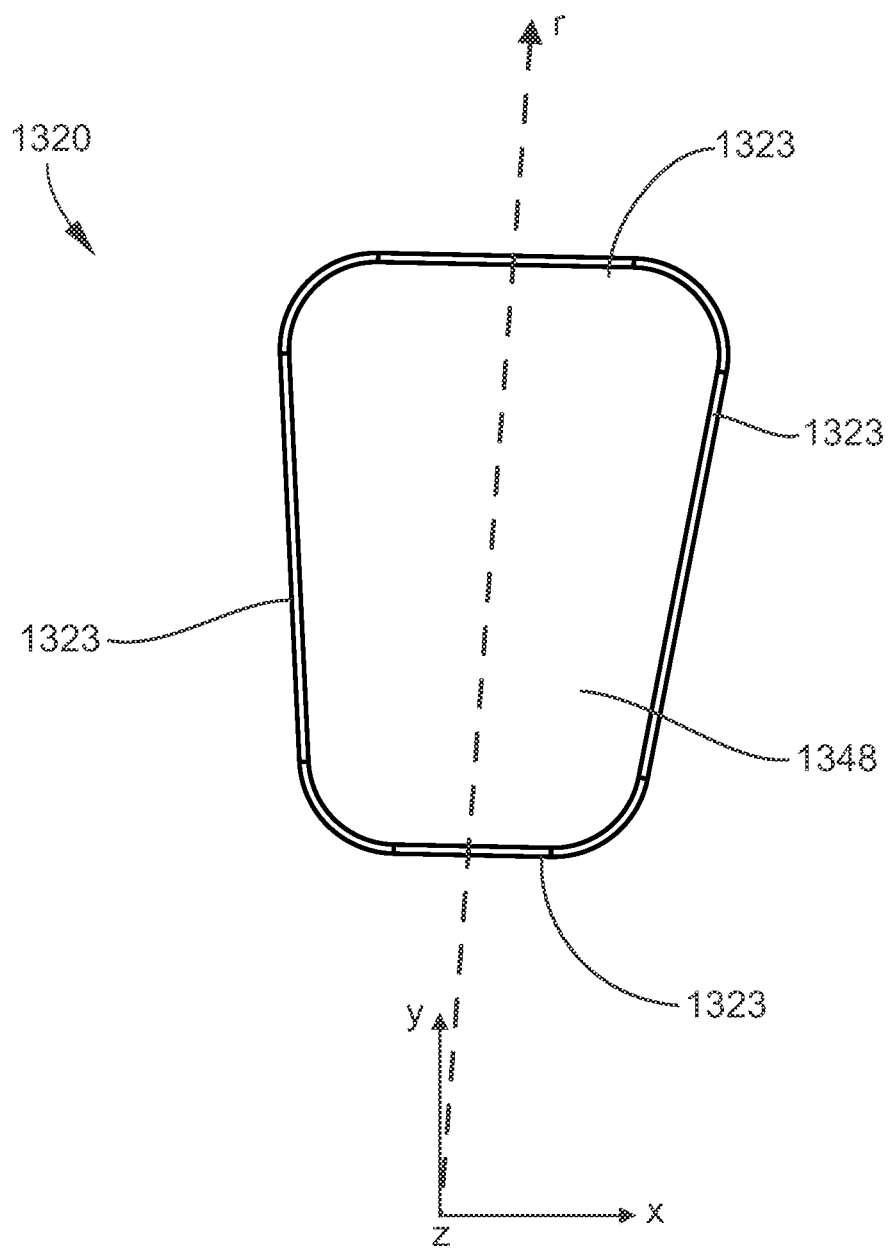
FIG. 13A is a schematic plan view of an example of an asymmetrical magnet according to an embodiment of the present disclosure.
Figure 13B:
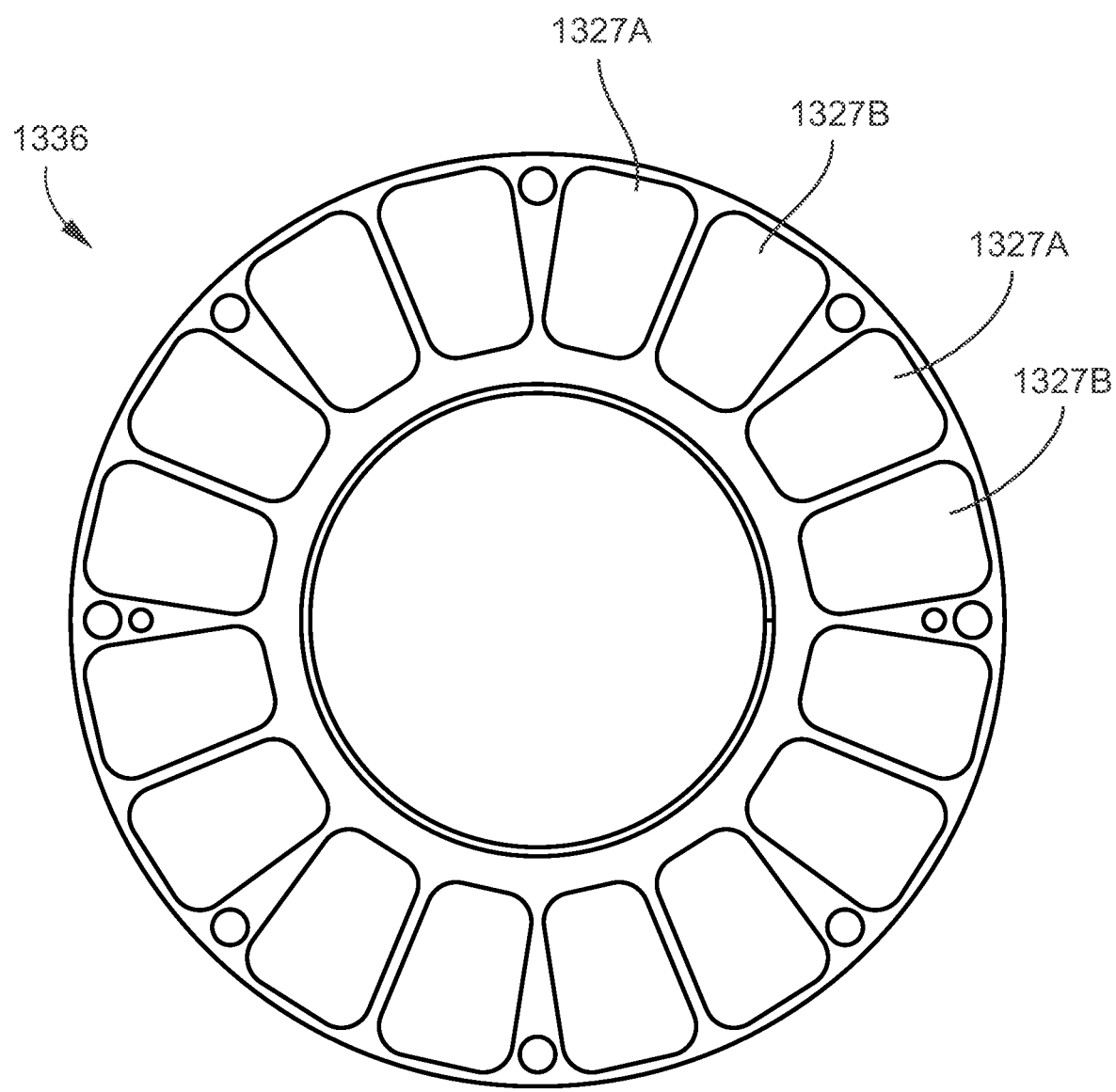
FIG. 13B is a schematic plan view of an example of a magnet support structure or retainer configured to hold an array of asymmetrical magnets such as illustrated in FIG. 13A, thereby forming a magnet assembly, according to an embodiment of the present disclosure.

FIG. 13A is a schematic plan view of an example of an asymmetrical magnet 1320 according to an embodiment. FIG. 13B is a schematic plan view of an example of a magnet support structure or retainer 1336 configured to hold an array of such asymmetrical magnets 1320 in a circumferential (or peripheral) arrangement about the axis of rotation, similar to the configuration described above and illustrated in FIG. 2A. The asymmetrical magnets 1320 and magnet support structure 1336 together form a magnet assembly, which may be utilized on the drive side or the driven side of a magnetic coupling assembly. This magnet assembly differs from the magnet assembly 212 shown in FIG. 2A in that the asymmetrical magnets 1320 are, as indicated, asymmetrical.

For reference purposes, FIG. 13A includes an Cartesian (x-y-z) frame of reference. The z-axis schematically represents the axis of rotation, which would correspond to the center of the magnet support structure 1336 and in practice the drive axis of the associated magnetic coupling assembly. In this example, the x-y plane corresponds to the transverse plane orthogonal to the drive axis L. A radial axis, r, passes roughly through the center of each asymmetrical magnet 1320 in the transverse plane ("roughly" in view of the asymmetry). For any given asymmetrical magnet 1320, the angle of such radial axis r relative to the designated x-axis and y-axis depends on the position of that asymmetrical magnet 1320 in the array of mounted to the magnet support structure 1336.

The asymmetrical magnet 1320 has an inside face 1348 in the transverse plane, on the inner side of the magnet assembly that faces the air gap when assembled as part of a magnetic coupling. The asymmetrical magnet 1320, or at least its inside face 1348, is shaped as a polygon defined by a plurality of edges or sides 1323 that form the closed boundary of the inside face 1348. The corners at which the sides 1323 meet may be rounded as illustrated or may not be rounded. The asymmetrical magnet 1320 may have three or more sides 1323. In the present embodiment, the asymmetrical magnet 1320 has four sides 1323 and thus, from the perspective of the transverse plane, may be described as being a quadrilateral, quadrangle, or tetragon. The asymmetry of the asymmetrical magnet 1320 may be characterized in different ways. As one example, the shape or geometry of the asymmetrical magnet 1320 (particularly in the transverse plane, e.g. the inside face 1348) is skewed, such as a skewed square, skewed rectangle, or skewed trapezoid. As another example, the lengths of opposite sides 1323 (e.g., top and bottom sides 1323, left and right sides 1323) are unequal. As another example, the asymmetrical magnet 1320 cannot be bisected into equally sized (in terms of area) halves by any line in the transverse plane. As an example of this latter attribute, in FIG. 13A, the radial axis r extending from the drive axis and across the asymmetrical magnet 1320 does not bisect the asymmetrical magnet 1320 into two equally sized (or shaped) halves. That is, the size and shape of the left half of the asymmetrical magnet 1320 (on the left side of the radial axis r) is different from the size and shape of the right half of the asymmetrical magnet 1320 (on the right side of the radial axis r). The same would hold true if the asymmetrical magnet 1320 were bisected into top and bottom halves (e.g., by a line orthogonal to the radial axis r), i.e., the sizes and shapes of the top and bottom halves would be different from each other.

As shown in FIG. 13B, the magnet support structure 1336 includes an array of first pockets or recesses 1327A and second pockets or recesses 1327B circumferentially spaced from each other about the drive axis. During assembly, the asymmetrical magnets 1320 are mounted in the first pockets 1327A and second pockets 1327B and secured in place by any suitable means. The first pockets 1327A and second pockets 1327B are organized into pairs, with each pair including one of the first pockets 1327A and one of the second pockets 1327B. The first pockets 1327A and second pockets 1327B are arranged in an alternating manner, such that each first pocket 1327A is between two second pockets 1327B immediately adjacent to that first pocket 1327A. The first pockets 1327A and second pockets 1327B have the same asymmetrical shape as the asymmetrical magnets 1320. However, the first pockets 1327A are mirror images of the second pockets 1327B. Consequently, from the perspective of the transverse plane, such as the inner side of the magnet support structure 1336 shown in FIG. 13B, the first pockets 1327A all have the same shape, the second pockets 1327B all have the same shape, the but the shape of the first pockets 1327A is different than (i.e., the inverse of) the second pockets 1327B.

The asymmetrical magnets 1320 may be magnetized and arranged in the same way as the magnet assembly 212 described above and illustrated in FIG. 2A. Thus, the asymmetrical magnets 1320 may be configured as north-south (N-S) magnetic dipoles, with the north and south poles located on the inside faces 1348 and the axially opposite outside faces, such that the magnetic flux is directed axially through the thickness of the asymmetrical magnets 1320 (namely, in the z-direction through the drawing sheet). Moreover, the asymmetrical magnets 1320 are circumferentially arranged with alternating polarities about the drive axis. Thus, for each asymmetrical magnet 1320, the polarity (e.g., N) at the inside face 1348 is opposite to the polarity (e.g., S) at the inside faces 1348 of the asymmetrical magnets 1320 that are immediately adjacent to that asymmetrical magnet 1320. In other words, as one moves either clockwise or counterclockwise from one asymmetrical magnet 1320 to another, the magnetic polar pattern is N-S-N-S-N- . . . .

Because of the asymmetrical shape of the asymmetrical magnets 1320 and the matching asymmetrical shape of the first pockets 1327A and second pockets 1327B of the magnet support structure 1336, a given asymmetrical magnet 1320 can be mounted in only a single predetermined orientation in any one of the pockets 1327. Moreover, all asymmetrical magnets 1320 are restricted to being mounted in the same orientation in the first pockets 1327A, and in the same orientation in the second pockets 1327B which the inverse or opposite orientation in comparison to the first pockets 1327A. Consequently, this configuration forces adherence to the alternating magnetic polar pattern N-S-N-S-N . . . during assembly. For example, assume that the inside surface 1348 of the asymmetrical magnet 1320 shown in FIG. 13A has the north pole N, and that the geometric orientation of the asymmetrical magnet 1320 (as shown in FIG. 13A) matches that of the first pockets 1327A. This means that during assembly, the asymmetrical magnet 1320 can only fit into one of the first pockets 1327A in the orientation shown in FIG. 13A, with the north pole N facing outward from the magnet support structure 1336. To be able to fit into the second pockets 1327B, the asymmetrical magnet 1320 must be inverted or "flipped" such that the side with the south pole S faces outward. As a result, after installing all asymmetrical magnets 1320 in the first pockets 1327A and second pockets 1327B, the alternating pattern of magnetic poles N-S-N-S-N- . . . is assured.

Accordingly, the present embodiment has the advantage of promoting error-free assembly of the magnet assembly. By comparison, symmetrically shaped magnets such as those shown in FIG. 2A may be prone to errors such as in the intended pattern of polarization, i.e., accidentally reversing the polarity of one or more magnets in the north-south, north-south pole pair sequence (e.g., obtaining N-N-S-N-S-S- . . . instead of N-S-N-S-N- . . . ).

In an embodiment, a balancing magnet (not shown) may be provided in the center of the magnet support structure 1336, as in the case of the magnet assembly 212 described above and illustrated in FIG. 2A.

It will be understood that terms such as "communicate with" and "in . . . communication with" (for example, a first component "communicates with" or "is in communication with" a second component), as well as "coupled to" or "coupled with," are used herein to indicate a structural, functional, mechanical, electrical, signal, optical, magnetic, electromagnetic, ionic or fluidic relationship between two or more components or elements. As such, the fact that one component is said to communicate with or be coupled to/with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A magnetic coupling assembly, comprising:
   a drive shaft rotatable on a drive axis;
   a driven shaft rotatable on the drive axis;
   a drive magnet assembly coupled to the drive shaft and rotatable therewith;
   a driven magnet assembly coupled to the driven shaft and rotatable therewith, and spaced from the drive magnet assembly by an air gap;
   a first housing coupled to the driven shaft and rotatable therewith, the first housing comprising at least one first seal surface;
   a second housing disposed about the drive axis and surrounding the first housing, the second housing comprising at least one second seal surface, wherein the first housing and the second housing at least partially define a chamber disposed about the drive axis; and
   a labyrinth seal comprising a sealing gap formed between the at least one first seal surface and the at least one second seal surface and fluidly communicating with the chamber, wherein:
   the chamber is disposed axially between the sealing gap and the driven magnet assembly; and
   the sealing gap has a size effective to limit gas conductance therethrough and thereby thermally isolate the chamber from a region external to the sealing gap and the chamber.

2. The magnetic coupling assembly of claim 1, wherein the size of the sealing gap has a dimension in a range from 0.001 inch to 0.040 inch.

3. The magnetic coupling assembly of claim 1, wherein the first housing comprises an outer surface and at least one rib disposed on the outer surface, and the at least one rib faces the driven magnet assembly and thermally isolates the driven magnet assembly from a remaining portion of the first housing.

4. The magnetic coupling assembly of claim 3, comprising a shim disposed between and in contact with the driven magnet assembly and the at least one rib, wherein the shim thermally isolates the driven magnet assembly from the at least one rib.

5. The magnetic coupling assembly of claim 1, wherein the second housing comprises an outer surface and a plurality of cooling fins extending outwardly from the outer housing.

6. The magnetic coupling assembly of claim 1, comprising a counterweight coupled to the first housing and rotatable therewith.

7. The magnetic coupling assembly of claim 1, wherein the second housing surrounds the driven magnet assembly.

8. The magnetic coupling assembly of claim 1, comprising a structural boundary disposed in the air gap.

9. The magnetic coupling assembly of claim 8, wherein the structural boundary is attached to or part of the second housing, and the structural boundary and the second housing cooperatively enclose the driven magnet assembly.

10. The magnetic coupling assembly of claim 1, comprising a pump element communicating with the driven shaft and movable thereby, wherein the sealing gap is configured to thermally isolate the chamber from heat energy emitted from the pump element.

11. The magnetic coupling assembly of claim 1, wherein the sealing gap is a first sealing gap, and the labyrinth seal further comprises a second sealing gap and defines a fluid path through the first sealing gap, through the second sealing gap, and into the chamber, and wherein the fluid path has one or more fluid contraction regions and/or one or more fluid expansion regions.

12. The magnetic coupling assembly of claim 11, wherein the first housing comprises a third seal surface, the second housing comprises a fourth seal surface, and the second sealing gap is formed between the third seal surface and the fourth seal surface.

13. The magnetic coupling assembly of claim 11, wherein the first housing comprises a first wall, the second housing comprises a second wall nested with the first wall, and the second sealing gap is formed between the first wall and the second wall.

14. A pump assembly, comprising:
the magnetic coupling assembly of claim 1;
a pump head comprising a fluid inlet and a fluid outlet; and
a pumping stage disposed in the pump head and communicating with the fluid inlet and the fluid outlet, the pumping stage comprising a pump element communicating with the driven shaft and movable thereby,
wherein movement of the drive shaft drives movement of the pump element via the magnetic coupling assembly, and the pumping stage is configured to pump fluid from the fluid inlet to the fluid outlet in response to the movement of the pump element.

15. The pump assembly of claim 14, wherein:
the pump element comprises an orbiting scroll blade;
the pumping stage further comprises a stationary scroll blade nested with the orbiting scroll blade; and
the orbiting scroll blade is configured to move in an orbiting manner relative to the stationary scroll blade in response to rotation of the driven shaft, to create at least one moving pocket between the orbiting scroll blade and the stationary scroll blade effective to pump fluid.

16. The pump assembly of claim 15, wherein the pumping stage further comprises a crank positioned in eccentric relation to the driven shaft and configured to move in an orbiting manner in response to rotation of the driven shaft, and the orbiting scroll blade is coupled to the crank.

17. A method for operating a magnetic coupling assembly, the method comprising:
providing the magnetic coupling assembly with a drive magnet assembly and a driven magnet assembly spaced from each other by an air gap, wherein the drive magnet assembly and the driven magnet assembly are coupled by a magnetic field;
providing a first housing coupled to the driven shaft and rotatable therewith, the first housing comprising at least one first seal surface;
providing a second housing disposed about the drive axis and surrounding the first housing, the second housing comprising at least one second seal surface, wherein the first housing and the second housing at least partially define a chamber disposed about the drive axis:
providing a labyrinth seal comprising a sealing gap formed between the at least one first seal surface and the at least one second seal surface and fluidly communicating with the chamber, wherein the chamber is disposed axially between the sealing gap and the driven magnet assembly; and
rotating the drive magnet assembly about a drive axis to drive rotation of the driven magnet assembly about the drive axis via the magnetic field, and to drive rotation of the at least one first seal surface relative to the at least one second seal surface,
wherein, during the rotating, the sealing gap has a size effective to limit gas conductance therethrough and thereby thermally isolate the chamber from a region external to the sealing gap and the chamber, and from which region heat energy propagates toward the sealing gap.

18. The method of claim 17, wherein, during the rotating of the driven shaft, the sealing gap has a size effective to maintain a temperature differential between the chamber and the region external to the sealing gap and the chamber in a range from 5° C. to 50° C.

19. The method of claim 17, comprising providing a pump element communicating with the driven shaft and movable thereby, wherein the sealing gap thermally isolates the chamber from heat energy emitted from the pump element.

20. The magnetic coupling assembly of claim 1, wherein:
at least one of the drive magnet assembly or the driven magnet assembly comprises a plurality of magnets circumferentially spaced from each other about the drive axis;
the magnets comprise respective inside faces facing the air gap; and
the inside face of each magnet is asymmetrical relative to a radial axis passing through the magnet.

* * * * *